United States Patent
MacLachlan et al.

(10) Patent No.: US 9,578,941 B2
(45) Date of Patent: Feb. 28, 2017

(54) TABLET OR LAPTOP SUPPORT CUSHION

(71) Applicant: Select Comfort Corporation, Minneapolis, MN (US)

(72) Inventors: Lori MacLachlan, Minneapolis, MN (US); Rebecca Karnes-Toth, Minneapolis, MN (US); Joseph E. Blazar, Minneapolis, MN (US)

(73) Assignee: Select Comfort Corporation, Minneapolis, MN (US)

( * ) Notice: Subject to any disclaimer, the term of this patent is extended or adjusted under 35 U.S.C. 154(b) by 0 days.

(21) Appl. No.: 14/518,945

(22) Filed: Oct. 20, 2014

(65) Prior Publication Data

US 2015/0108188 A1    Apr. 23, 2015

Related U.S. Application Data

(60) Provisional application No. 61/893,380, filed on Oct. 21, 2013.

(51) Int. Cl.
*A45C 11/00* (2006.01)
*F16M 11/38* (2006.01)
(Continued)

(52) U.S. Cl.
CPC ............. *A45C 11/00* (2013.01); *F16M 11/10* (2013.01); *F16M 11/38* (2013.01); *F16M 13/00* (2013.01);
(Continued)

(58) Field of Classification Search
CPC . A45C 11/00; A45C 220/15; A45C 2011/003; A45C 2013/028; F16M 11/16; F16M 11/38; H05K 5/0204; H05K 5/0086
(Continued)

(56) References Cited

U.S. PATENT DOCUMENTS 4,259,568 A * 3/1981 Dynesen ............. G06F 15/0216
206/305
4,654,907 A * 4/1987 Haugaard ................ A45C 3/10
297/17

(Continued)

OTHER PUBLICATIONS

Ipevo, Ipevo Pad Pillow for iPad Air & iPad, Amazon.com, product review posted with images on Feb. 17, 2013 (Just what I was looking for . . . ) https://www.amazon.com/Ipevo-PadPillow-Stand-1Nexus-Galaxy/dp/B017VRDPJW/ref=pd_Ipo_147_bs_t_2?_encoding=UTF8&psc=1&refRID=V75TNFCV14HGS5XQMKXJ.*

(Continued)

*Primary Examiner* — Anthony Stashick
*Assistant Examiner* — Ernesto Grano
(74) *Attorney, Agent, or Firm* — Fish & Richardson P.C.

(57) ABSTRACT

A support cushion comprising a first member comprising a first support surface and a second member coupled to the first member, the second member comprising a second support surface. The second member is configured to move relative to the first member between a first configuration and a second configuration. The first support surface of the first member and the second support surface of the second member are configured to cooperatively support a first electronic device when the second member is in the first configuration, and the first support surface of the first member is configured to support a second electronic device when the second member is in the second configuration.

20 Claims, 25 Drawing Sheets

(51) Int. Cl.
*F16M 11/10* (2006.01)
*F16M 13/00* (2006.01)

(52) U.S. Cl.
CPC ..... *A45C 2011/003* (2013.01); *A45C 2200/15* (2013.01)

(58) Field of Classification Search
USPC .................................................. 206/320, 760
See application file for complete search history.

(56) References Cited

U.S. PATENT DOCUMENTS

| | | | | |
|---|---|---|---|---|
| D299,988 S | * | 2/1989 | Parabita | ........................... 5/420 |
| 5,445,266 A | * | 8/1995 | Prete | .................. A45C 7/0086 |
| | | | | 190/102 |
| 5,887,723 A | * | 3/1999 | Myles | .................. G06F 1/1626 |
| | | | | 206/305 |
| 6,269,948 B1 | * | 8/2001 | Jackson | ............... A45C 7/0095 |
| | | | | 108/43 |
| D486,876 S | * | 2/2004 | Wilbanks | ..................... D21/809 |
| 6,772,879 B1 | * | 8/2004 | Domotor | ................ A45C 11/00 |
| | | | | 206/320 |
| 6,892,880 B2 | * | 5/2005 | Nieves | .................. A45C 11/00 |
| | | | | 206/305 |
| 6,967,836 B2 | * | 11/2005 | Huang | ..................... A45C 3/02 |
| | | | | 361/679.46 |
| D573,150 S | * | 7/2008 | Sween | .......................... D14/447 |
| 7,545,634 B2 | | 6/2009 | Simonian et al. | |
| 7,614,691 B1 | * | 11/2009 | Schmitz | ................. A47C 7/021 |
| | | | | 297/219.1 |
| D637,031 S | | 5/2011 | Anderson | |
| D643,845 S | * | 8/2011 | Hong | ........................... D14/447 |
| 8,282,065 B1 | * | 10/2012 | Stone | .................. A47B 23/044 |
| | | | | 16/221 |
| 8,424,829 B2 | | 4/2013 | Lu et al. | |
| D696,258 S | * | 12/2013 | Padilla | ........................ D14/447 |
| D703,216 S | * | 4/2014 | Klepar | .......................... D14/447 |
| 8,724,300 B2 | * | 5/2014 | Smith | .................... G06F 1/1628 |
| | | | | 206/320 |
| 8,757,375 B2 | | 6/2014 | Huang | |
| D709,075 S | * | 7/2014 | Miniard | ....................... D14/447 |
| 8,763,795 B1 | * | 7/2014 | Oten | ....................... A45C 11/00 |
| | | | | 206/320 |
| D714,807 S | * | 10/2014 | Pulver | .......................... D14/447 |
| 8,887,902 B1 | * | 11/2014 | Liu | ........................ G06F 1/1628 |
| | | | | 206/320 |
| 8,887,910 B2 | * | 11/2014 | Ashley | ................... A45C 11/00 |
| | | | | 206/320 |
| D722,059 S | * | 2/2015 | Hirst | ........................... D14/440 |
| 8,960,421 B1 | * | 2/2015 | Diebel | ...................... G06F 1/00 |
| | | | | 206/320 |
| 9,033,147 B2 | * | 5/2015 | Lee | ......................... A45C 11/00 |
| | | | | 206/320 |
| 2004/0195146 A1 | * | 10/2004 | Lopez | .................. A45C 7/0095 |
| | | | | 206/576 |
| 2008/0302687 A1 | * | 12/2008 | Sirichai | ..................... A45F 5/02 |
| | | | | 206/320 |
| 2010/0122924 A1 | * | 5/2010 | Andrews | .................. A45C 9/00 |
| | | | | 206/320 |
| 2010/0294909 A1 | * | 11/2010 | Hauser | ...................... B42D 9/00 |
| | | | | 248/456 |
| 2011/0203955 A1 | * | 8/2011 | Fasula | ...................... A45C 3/02 |
| | | | | 206/320 |
| 2011/0204843 A1 | * | 8/2011 | Foster | .................... A45C 11/00 |
| | | | | 320/101 |
| 2011/0266194 A1 | * | 11/2011 | Bau | ........................ A45C 11/00 |
| | | | | 206/736 |
| 2011/0272305 A1 | * | 11/2011 | Lee | .......................... A45C 5/03 |
| | | | | 206/320 |
| 2012/0037523 A1 | * | 2/2012 | Diebel | ................... A45C 11/00 |
| | | | | 206/320 |
| 2012/0146466 A1 | * | 6/2012 | Lu | ........................ A45C 7/0036 |
| | | | | 312/223.1 |
| 2013/0026329 A1 | | 1/2013 | Lane et al. | |
| 2013/0284866 A1 | | 10/2013 | Lee | |
| 2014/0158563 A1 | | 6/2014 | Young | |

OTHER PUBLICATIONS

'Levenger', [online]. "Thai Pad," [Retrieved on Dec. 16, 2014], Retrieved from the Internet: URL http://www.levenger.com/thai-pad---new-core-7614.aspx, 4 pages.

* cited by examiner

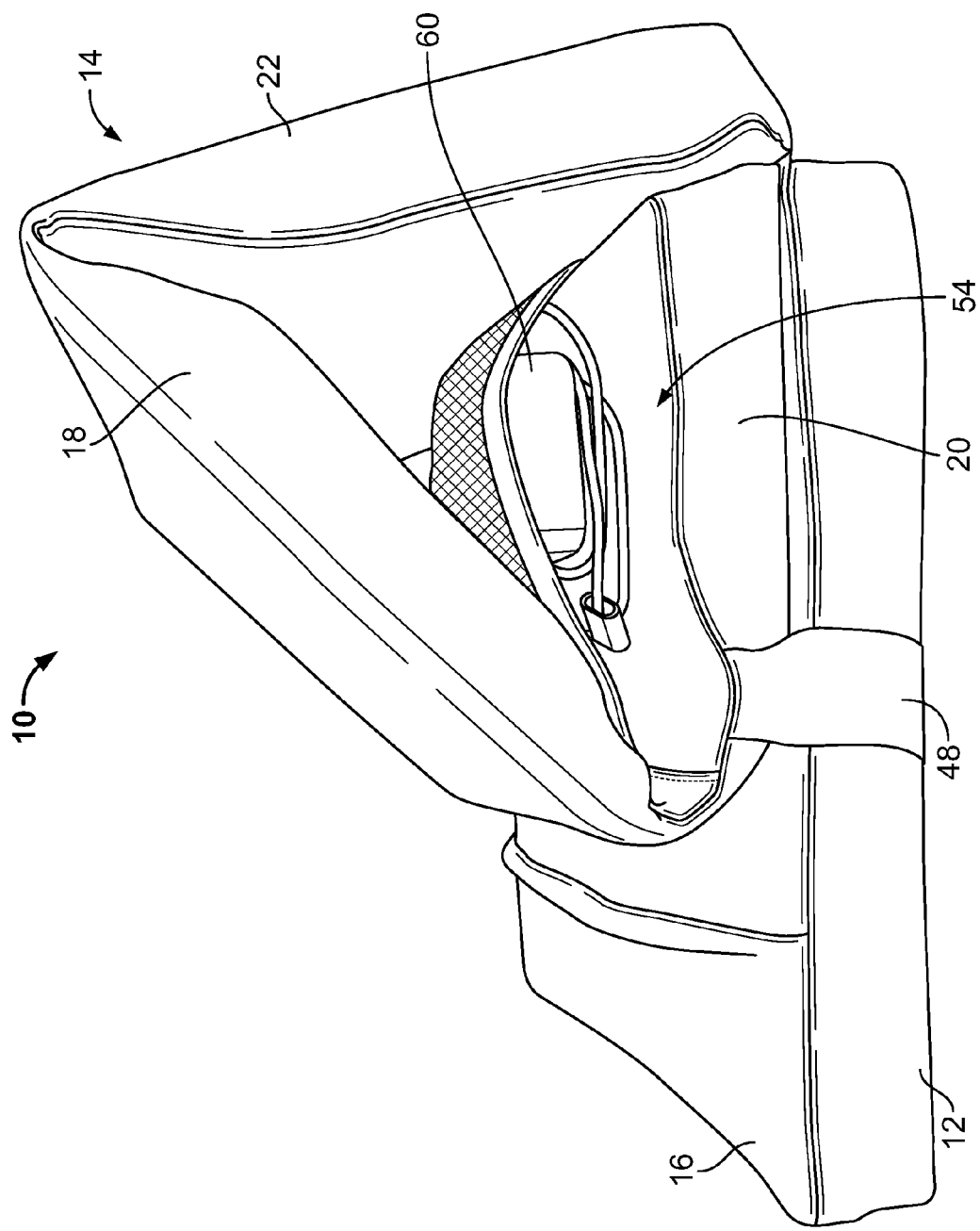

TABLET OR LAPTOP SUPPORT CUSHION

CROSS REFERENCE TO RELATED APPLICATIONS

This application claims the benefit of U.S. Provisional Application Ser. No. 61/893,380, filed Oct. 21, 2013, the content of which is incorporated herein by reference in its entirety.

BACKGROUND

Smaller sized computing devices, such as laptop computers, have become commonplace. Similarly, the use of handheld electronic devices, such as tablet computing devices or e-readers, has also become prolific. However, the use of such devices can be uncomfortable for prolonged periods of time, particularly if a user is in a supine or semi-supine position, such as while sitting or lying on a bed or other support structure configured to support a human in a prone or supine position.

SUMMARY

The present disclosure is directed to a cushion that can be used to support tablets or other handheld devices, such as e-readers, and laptop computers. The cushion can be configured to move between a first configuration designed for a tablet or other substantially flat and substantially thin electronic device and a second configuration designed for a laptop computer.

The present disclosure describes a support cushion comprising a first member comprising a first support surface and a second member coupled to the first member, the second member comprising a second support surface. The second member is configured to move relative to the first member between a first configuration and a second configuration. The first support surface of the first member and the second support surface of the second member are configured to cooperatively support a first electronic device when the second member is in the first configuration, and the first support surface of the first member is configured to support a second electronic device when the second member is in the second configuration.

BRIEF DESCRIPTION OF THE FIGURES

FIG. 25 is a side view of the example support cushion in the first configuration with an object stored in a storage pocket in the storage compartment.

DETAILED DESCRIPTION

This disclosure describes a support cushion configured to support an electronics device while the device is being used by a user, for example so that the user can use the device while resting in a supine or semi-supine position. In particular, the support cushion can be configured to support a substantially flat device, including, but not limited to substantially-flat, touchscreen computing devices commonly referred to as a "tablet," such as the Apple IPAD tablet device, a Google NEXUS tablet device, or a Samsung GALAXY TAB tablet device, and devices for reading electronic books commonly referred to as "e-readers," such as an Amazon KINDLE or a Barnes & Noble NOOK. For the sake of brevity, tablet computing devices (e.g., the Apple IPAD) and e-readers (e.g., the Amazon KINDLE) will both be referred to herein as "tablet" or "tablets." The support cushion can also be configured to support a clamshell-type computing device commonly referred to as a "laptop computer" or "notebook computer" (referred to collectively herein as "laptop" or "laptops").

Figure 14:
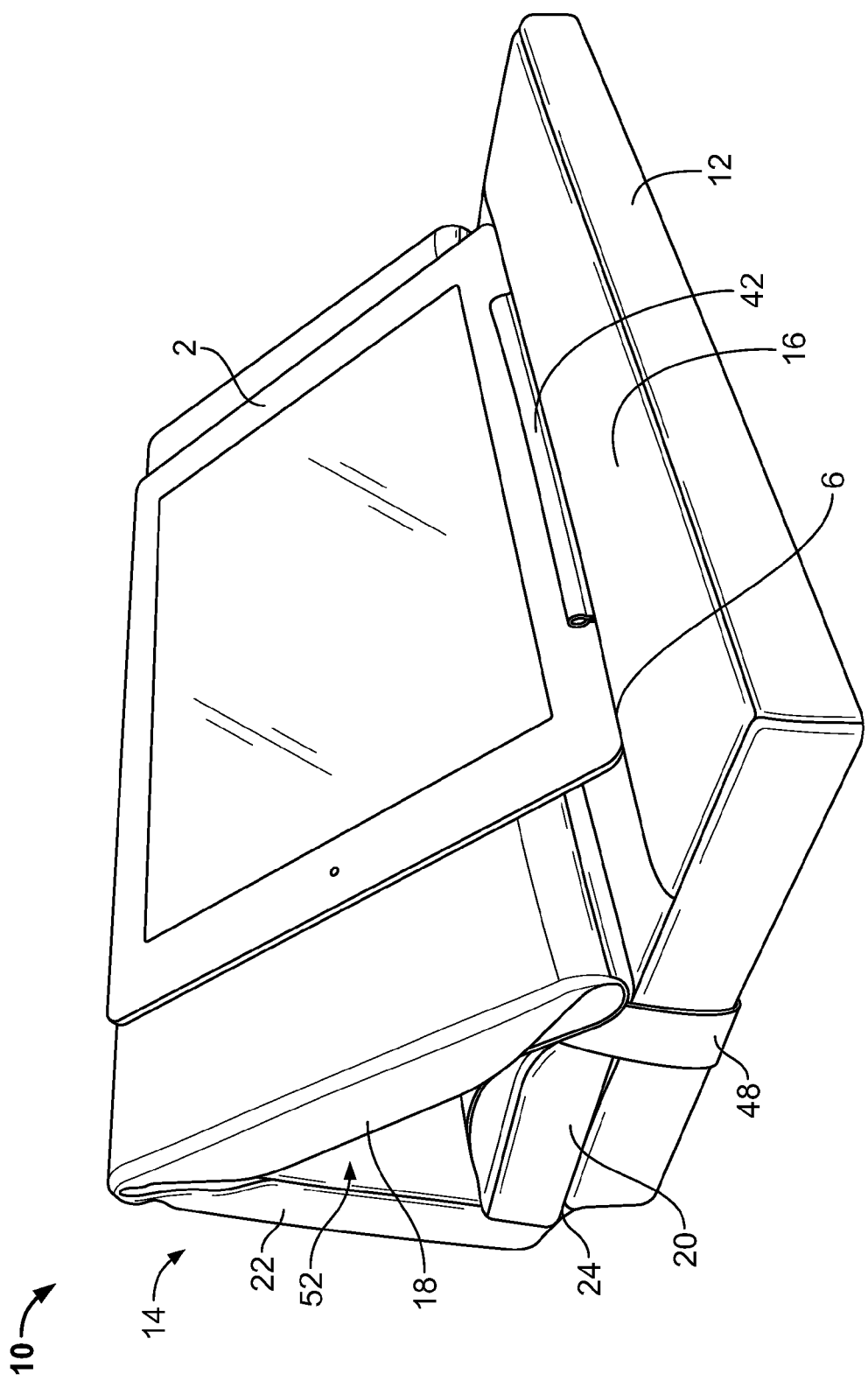
FIG. 14 is a front perspective view of the example support cushion in the first configuration with a tablet device being supported by the support cushion.
Figure 15:
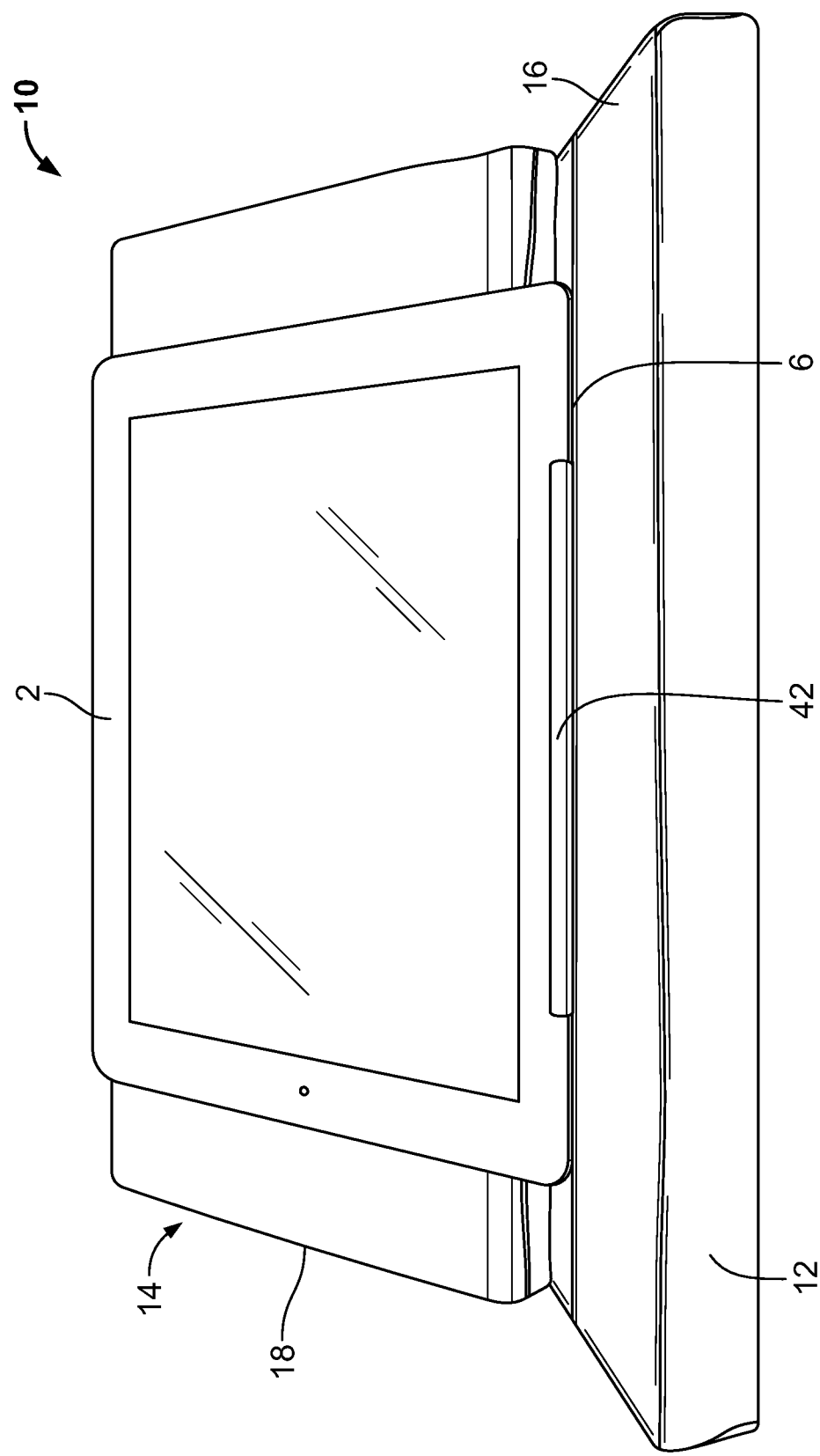
FIG. 15 is a front view of the example support cushion in the first configuration with a tablet device being supported by the support cushion.
Figure 16:
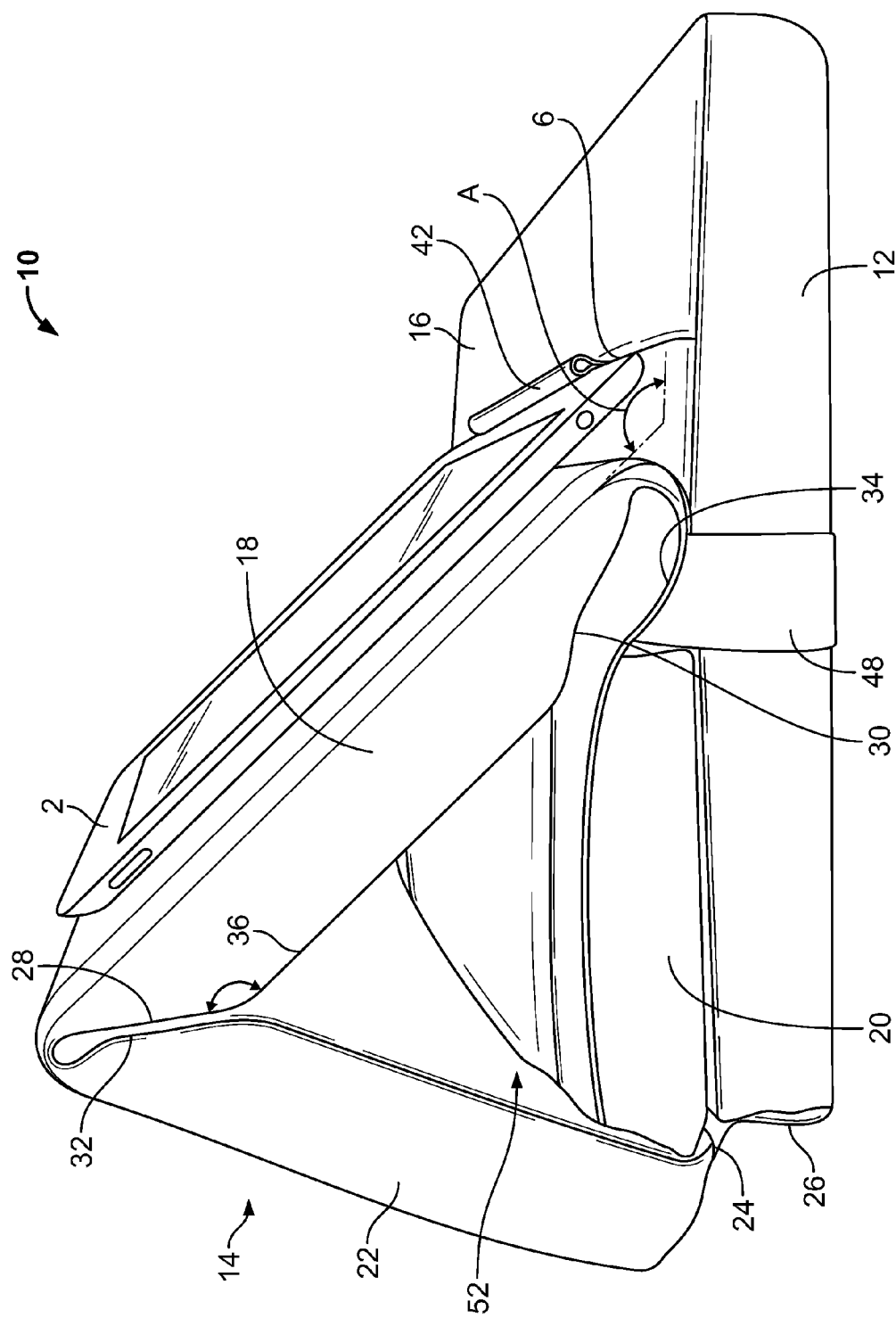
FIG. 16 is a side view from a second side of the example support cushion in the first configuration with a tablet device being supported by the support cushion.
Figure 17:
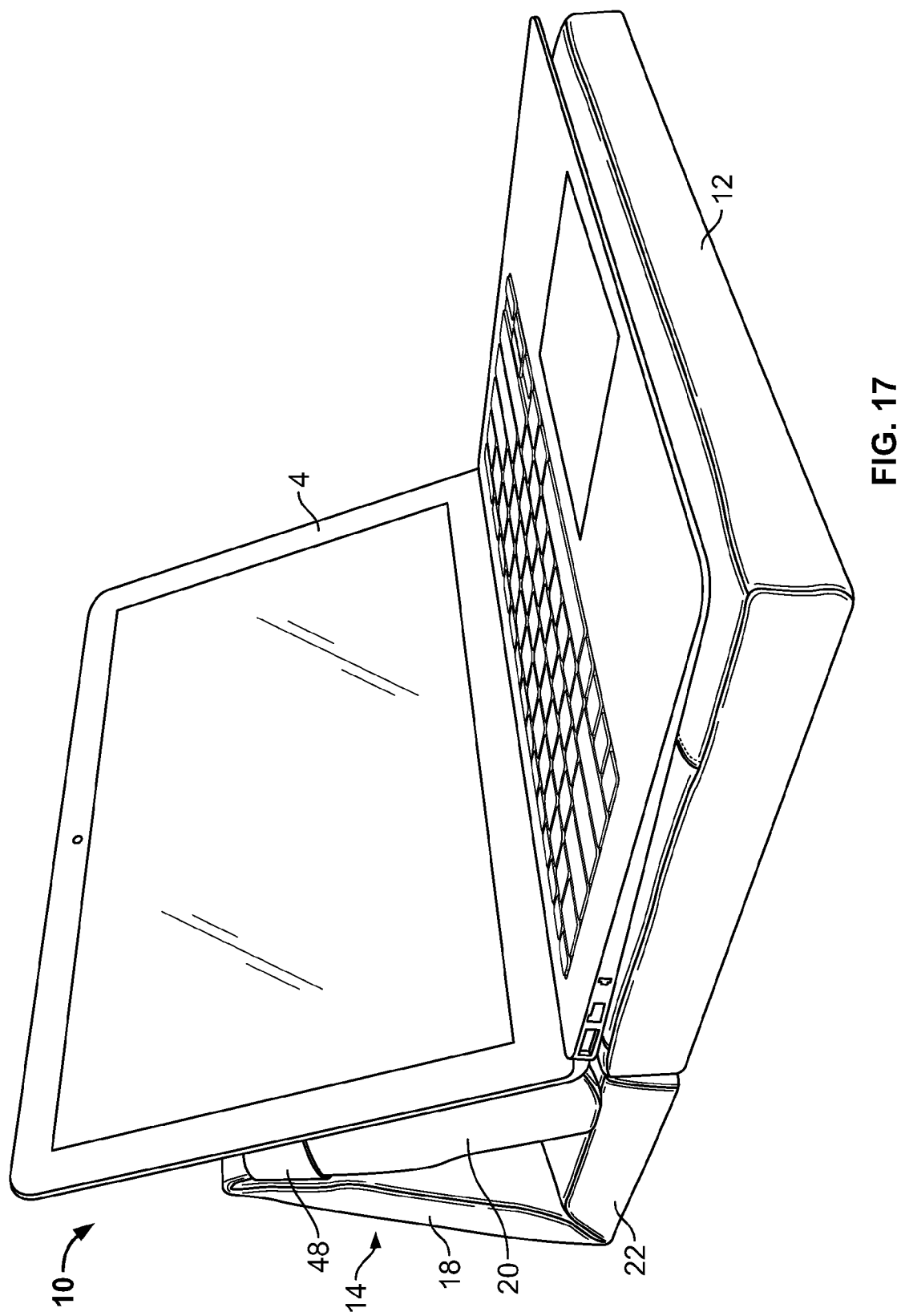
FIG. 17 is a front perspective view of the example support cushion in the second configuration with a laptop computer being supported by the support cushion.
Figure 18:
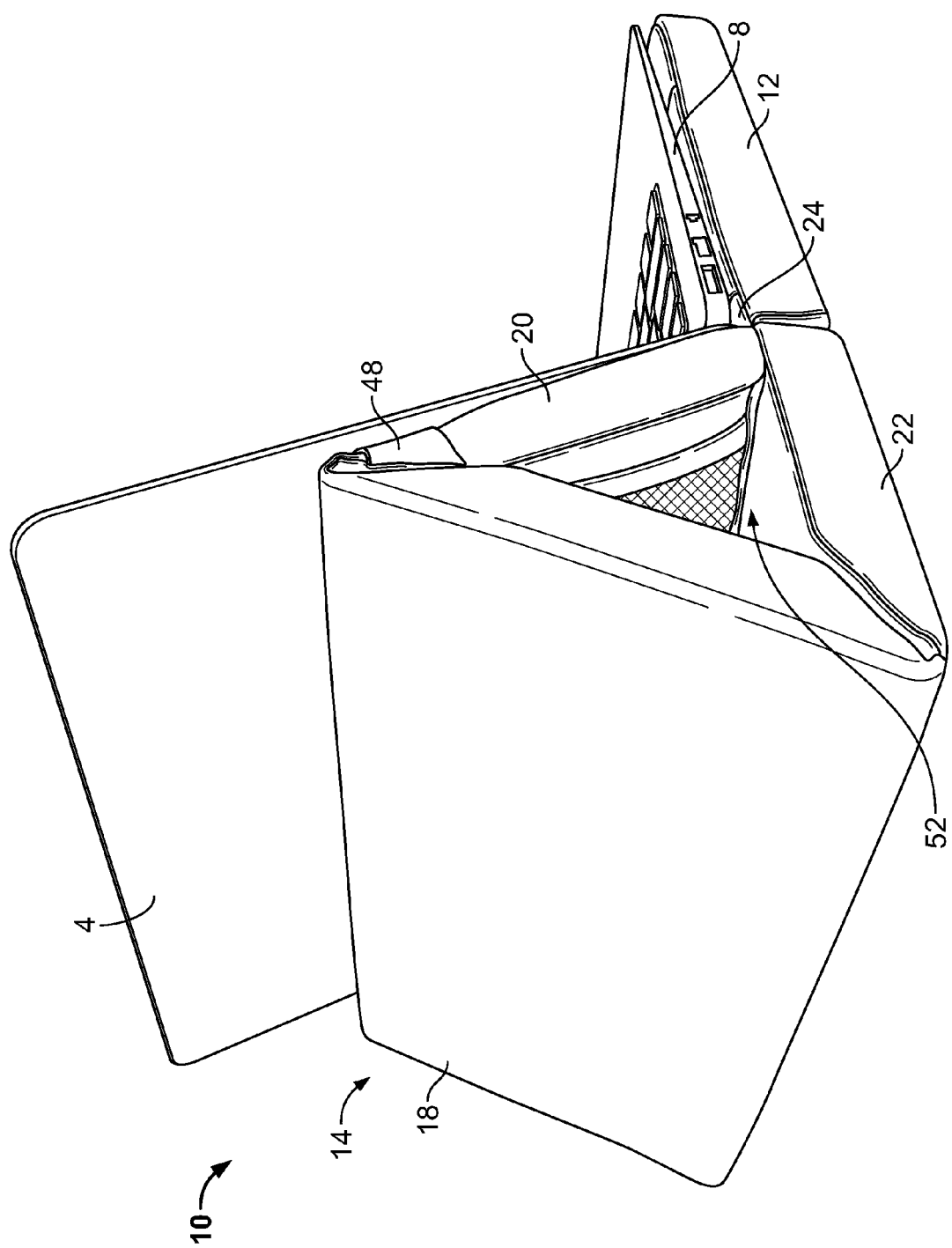
FIG. 18 is a rear perspective view of the example support cushion in the second configuration with a laptop computer being supported by the support cushion.
Figure 19:
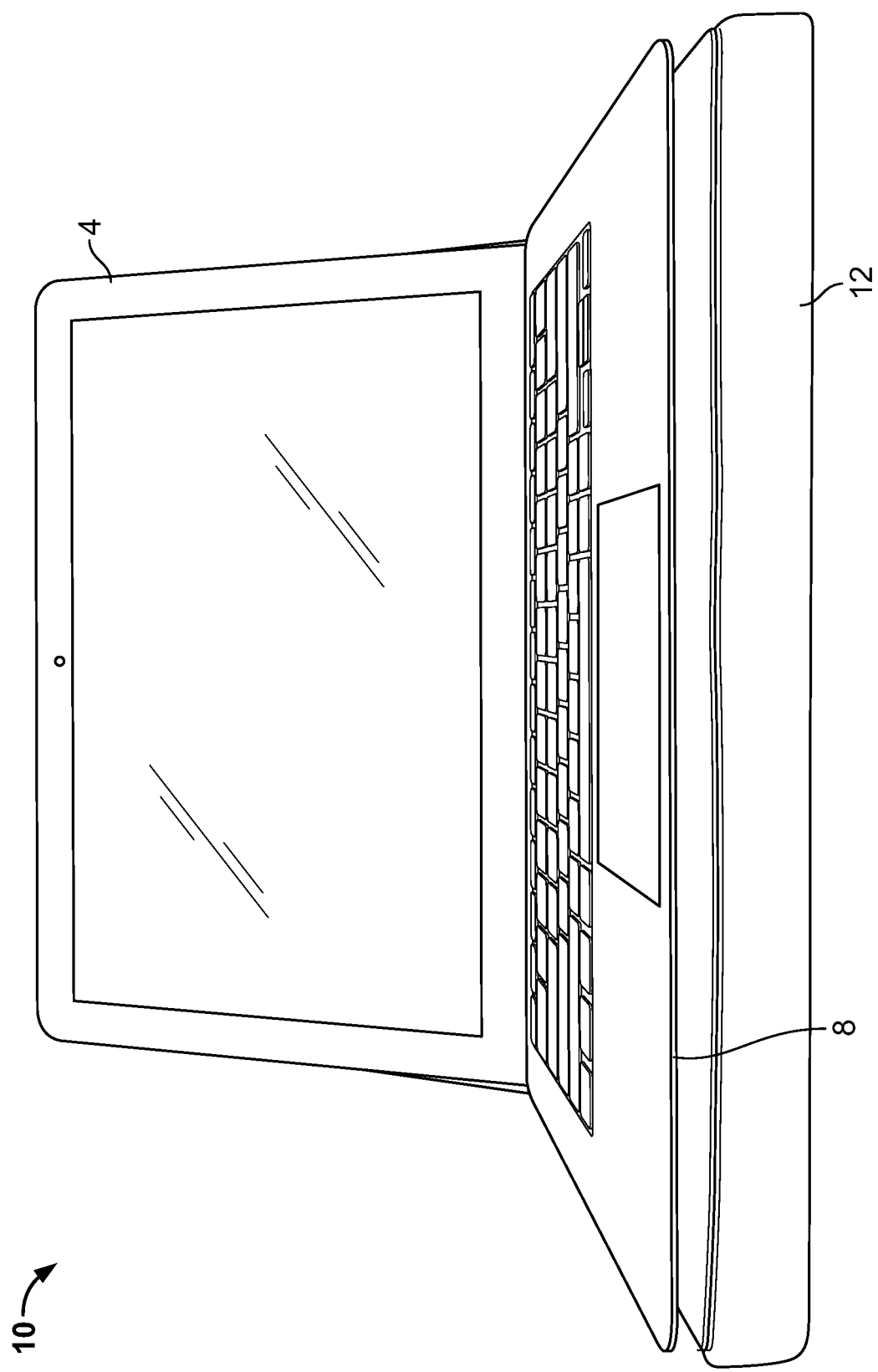
FIG. 19 is a front view of the example support cushion in the second configuration with a laptop computer being supported by the support cushion.
Figure 20:
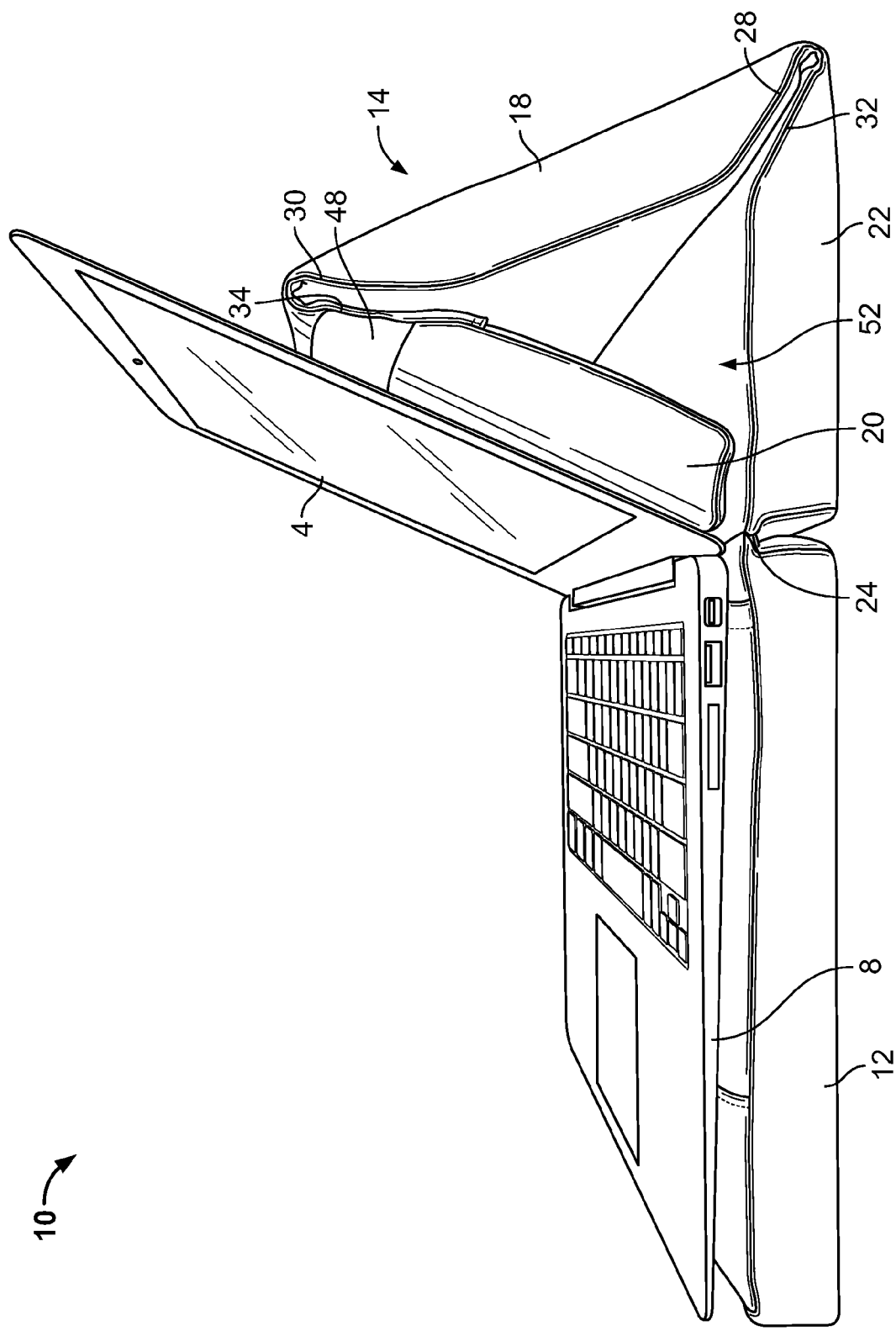
FIG. 20 is a side view of the example support cushion in the second configuration with a laptop computer being supported by the support cushion.
Figure 21:
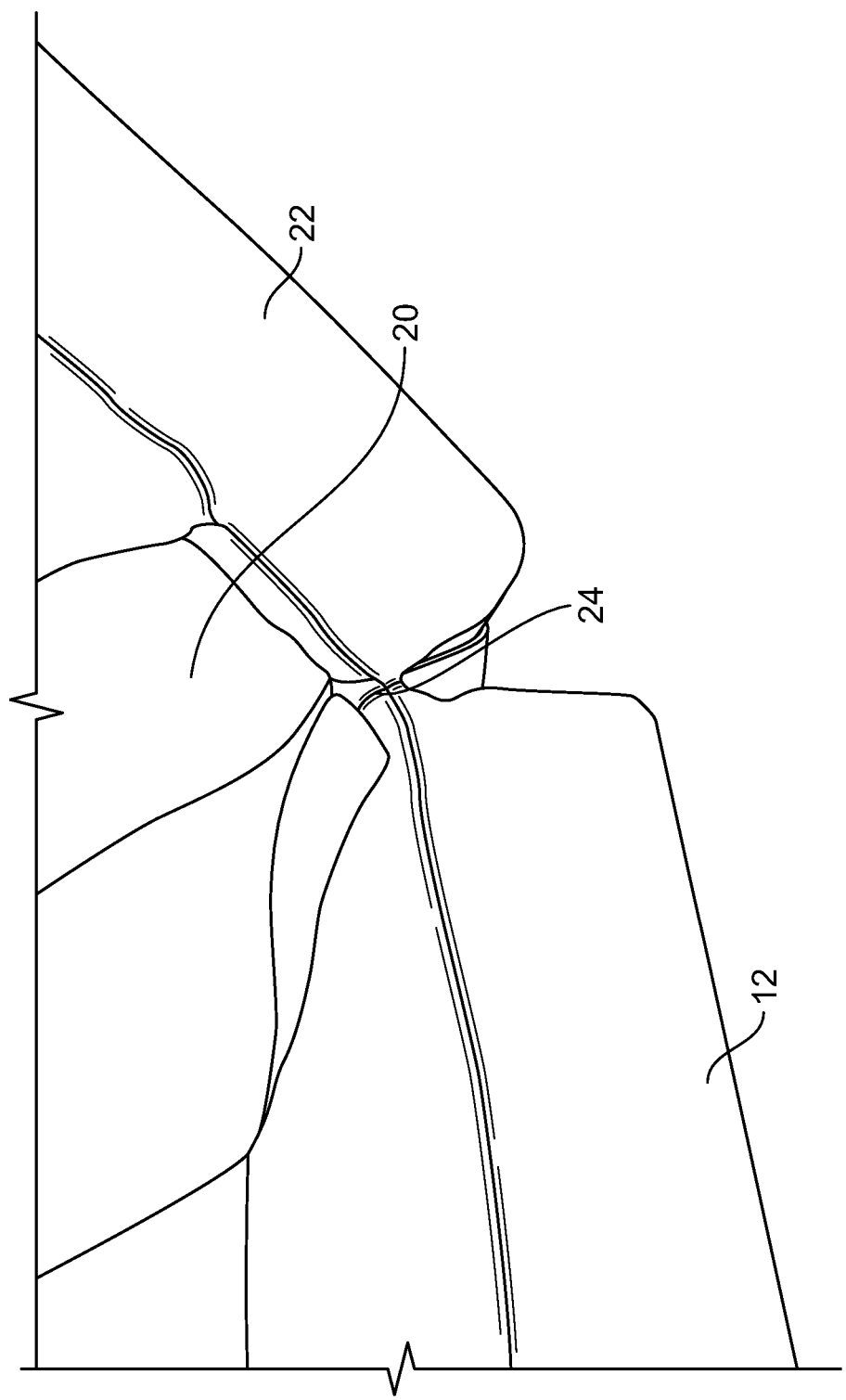
FIG. 21 is a close up view of a pivoting joint between a base member and a back member of the example support cushion.

FIGS. 1-23 show various views of an example support cushion 10 that can be used to support an electronics device. The support cushion 10 can be configured to be movable between a first configuration, as shown in FIGS. 1, 3-8, and 14-16, and a second configuration, as shown in FIGS. 2, 9-13 and 17-20. In particular, as described in more detail below, the support cushion 10 can be particularly suited for supporting a tablet 2 when in the first configuration, for example as shown in FIGS. 14-16. For this reason, the first configuration of the support cushion 10 is also referred to herein as the "tablet configuration" or the "tablet mode." As further described below, the support cushion 10 can be particularly suited for supporting a laptop 4 when in the second configuration, as shown in FIGS. 17-20. For this reason, the second configuration of the support cushion 10 is also referred to herein as the "laptop configuration" or the "laptop mode."

The support cushion 10 can include a base member 12 and a back member 14 coupled to the base member 12. The base member 12 can be configured to rest on a generally horizontally oriented surface or surfaces, such as a user's lap or on top of a support surface, such as a mattress. The base member 12 can include a generally planar upper surface 16 for supporting a bottom edge or a bottom side of a device, such as a bottom edge 6 of a tablet 2 or a bottom side 8 of a laptop 4.

The back member 14 can be configured so that at least a portion of the back member 14 extends generally vertically upwardly relative to generally horizontal base member 12. The back member 14 can include a device support member 18 configured to provide support for a tablet 2 placed on the support cushion 10, when the support cushion 10 is in the tablet mode (see, e.g., FIG. 14). The device support member 18 and the base member 12 can cooperate to support the tablet 2 when the support cushion 10 is in the tablet mode. The back member 14 can also include one or more structural members 20, 22 that can be configured to provide additional structural support to the device support member 18, for example to further support a tablet 2 positioned on the support cushion 10.

In an example, the back member 14 includes a first structural member 20 and a second structural member 22. As is further shown in the Figures, the device support member 18 and the structural members 20, 22 can be substantially planar members that can be positioned and oriented relative to each other so that the back member 14 has the general shape of a triangular prism with the members 18, 20, 22 forming the walls of the triangle (best seen in FIGS. 1, 7, 8, 13, 14, 16-18, and 20). The triangular-shaped cross section of the back member 14 can provide sufficient structural strength and integrity to support a device, and in particular to support a tablet 2 when the support cushion 10 in is the tablet mode.

In an example, the device support member 18 and the structural members 20, 22 can be secured together so that the device support member 18 and the structural members 20, 22 are fixed with respect to each other so that, for example, the device support member 18 does not move substantially with respect to the structural members 20, 22, the first structural member 20 does not move substantially with respect to the device support member 18 and the second structural member 22, and the second structural member 22 does not move substantially with respect to the device support member 18 and the first structural member 20. In an example, each member 18, 20, 22 can be secured to adjacent members by stitching or adhering the members 18, 20, 22 together.

As noted above, the support cushion 10 can be configured to be moveable between a first configuration, referred to herein as the tablet mode, and a second configuration, referred to herein as the laptop mode. The change from the tablet mode to the laptop mode can be effectuated by moving the back member 14 relative to the base member 12. The back member 14 can be pivotally coupled to the base member 12. The pivotal connection between the base member 12 and the back member 14 can occur along a joint 24 that runs along a back edge 26 of the base member 12 (see, e.g., FIGS. 4, 7, 11-13, 16, 18, 20, and 21). The joint 24 can connect to the back member 14 at the junction between the first structural member 20 and the second structural member 22. The joint 24 can comprise a piece of fabric that spans across the space between the base member 12 and the back member 14 (see, e.g., FIG. 21).

Figure 7:
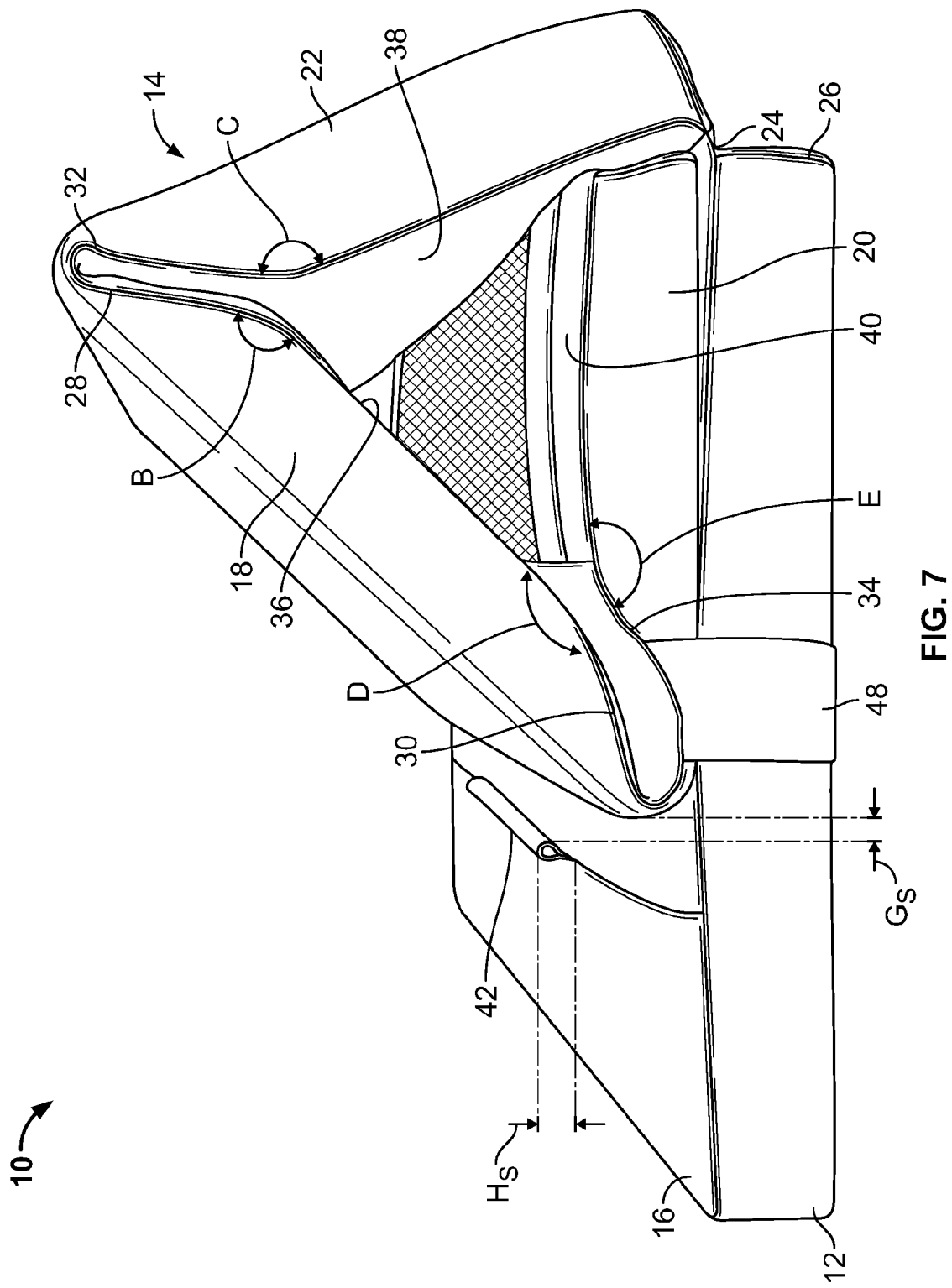
FIG. 7 is a side view from a first side of the example support cushion in the first configuration.
Figure 8:
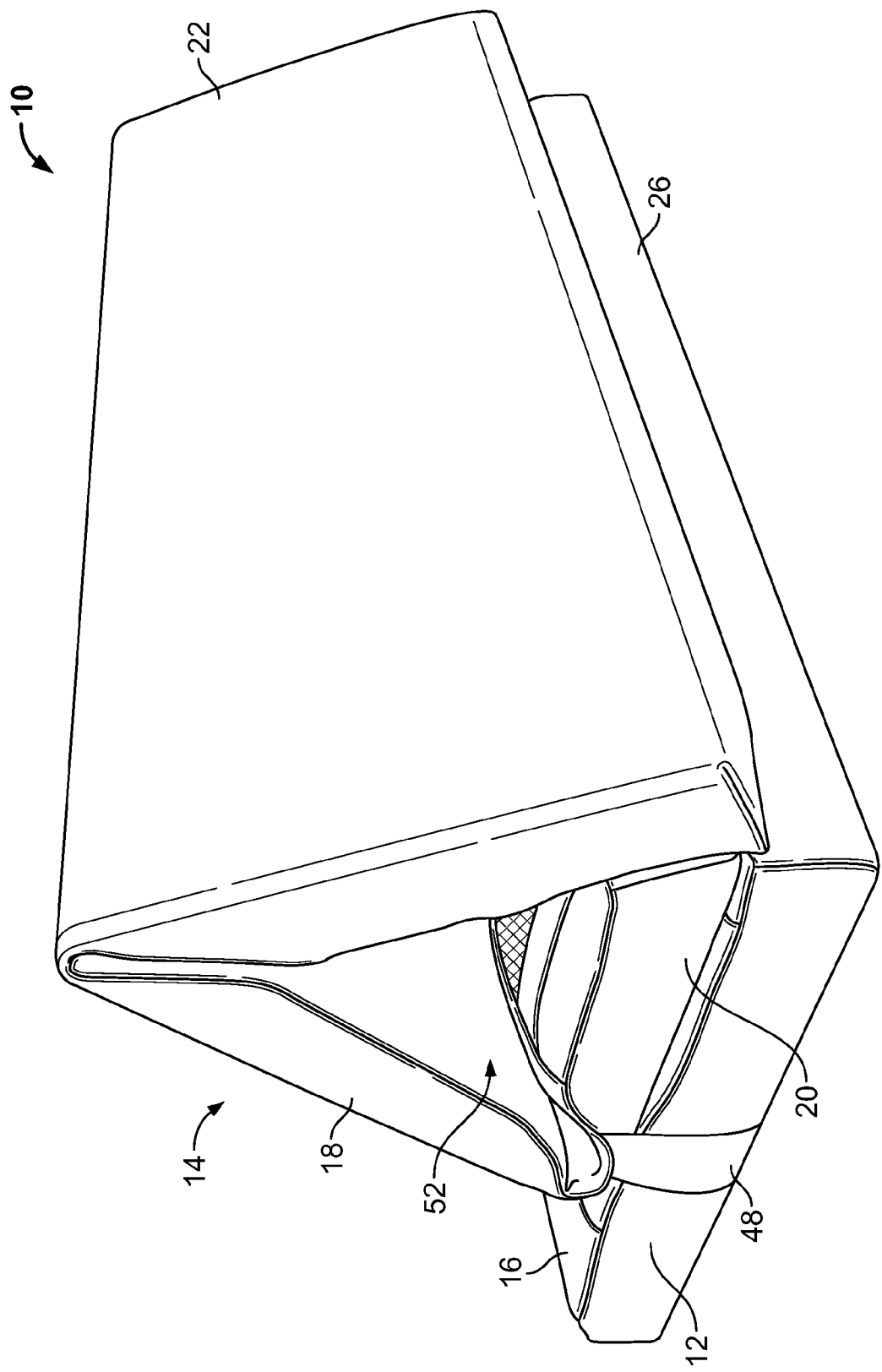
FIG. 8 is a rear perspective view of the example support cushion in the first configuration.

The back member 14 can be configured so that when the support cushion 10 is in the tablet mode the device support member 18 is oriented at a desired angle A relative to the base member 12 (see, e.g., FIGS. 7 and 16). When a tablet 2 is being supported by the support cushion 10, the angled orientation of the device support member 18 relative to the base member 12 at the angle A can also cause the tablet 2 to be angled with respect to the base member 12 at the same angle A or approximately equal to the angle A (FIG. 16). In an example, the angle A of the device support member 18 relative to the base member 12 when the support cushion 10 is in the tablet mode is from about 105° to about 145°, such as from about 120° to about 130°, such as about 124°. In an example, both the base member 12 and the device support member 18 are substantially planar or at least have substantially planar surfaces that will support the tablet 2, which is also substantially planar.

As noted above, the one or more structural members 20, 22 of the back member 14 can be configured to provide sufficient structural support to the device support member 18 while the support cushion 10 is supporting the tablet 2. In an example, the device support member 18 and the one or more structural members 20, 22 can be shaped or otherwise configured to provide sufficient structural integrity in order to support the device support member 18 and the tablet 2. In an example, the device support member 18 can comprise at least one bevel that is configured to engage or mate with a corresponding bevel on an adjacent structural member 20, 22.

In an example, best seen in FIGS. 7 and 16, the device support member 18 comprises a top bevel 28 along a top edge (when in the tablet mode) of the device support member 18 and a bottom bevel 30 along a bottom edge (when in a tablet mode) of the device support member 18. The top bevel 28 can mate with and engage a corresponding bevel 32 along a top edge (when in the tablet mode) of the second structural member 22 to form a first miter joint at the top edge of the device support member 18. The bottom bevel 30 of the device support member 18 can mate with and engage a corresponding bevel 34 along an edge of the first structural member 20 to form a second miter joint at the bottom edge of the device support member 18.

Each bevel 28, 30 of the device support member 18 can form an angle relative to a back surface 36 of the device support member 18, with the angle of each bevel 28, 30 being complementary with an angle of the corresponding bevel 32, 34 of the structural members 20, 22. For example, the angle B of the top bevel 28 relative to the back surface 36 and the angle C of the bevel 32 relative to a front surface 38 of the structural member 22 can cooperate so that an angle formed between the device support member 18 and the structural member 22 is a desired angle. Similarly, the angle D of the bottom bevel 30 relative to the back surface 36 and the angle E of the bevel 34 relative to a top surface 40 of the structural member 20 can cooperate so that an angle formed between the device support member 18 and the structural member 20 is a desired angle.

In an example, the angle B of the top bevel 28 is from about 130° to about 160°, such as from about 140° to about 150°, for example about 145°. In an example, the angle C of the bevel 32 of the structural member 22 is from about 140° and about 170°, such as from about 150° to about 160° for example about 157°. In an example, the angle D of the bottom bevel 30 is from about 140° to about 170°, such as from about 150° to about 160°, for example about 154°. In an example, the angle E of the bevel 34 of the structural member 20 is from about 140° to about 170°, such as from about 145° to about 160°, for example about 150°. In an example, the angle between the device support member 18 and the structural member 22 is from about 50° to about 65°, such as about 58°. In an example, the angle between the device support member 18 and the structural member 20 is from about 50° to about 65°, such as about 56°. In an example, the angle between the first structural member 20 and the second structural member 22 is from about 50° to about 80°, such as about 67°.

The base member 12 can include a stop 42 that protrudes vertically above an upper surface 16 of the base member 12. The stop 42 can act to inhibit an edge 6 of the tablet 2 from sliding along the surface of the base member 12. The stop 42 can, therefore, maintain the orientation of the table 2 in a substantially upright orientation relative to the base member 12 (e.g., at the angle A). In an example, the stop 42 is spaced from the device support member 18 along the upper surface 16 of the base member 12 by a gap space Gs that is substantially equal to, or slightly larger than, a thickness of the tablet 2, with an additional tolerance, when the support cushion 10 is in the tablet mode. In an example, the gap space Gs can be selected to accommodate the thickness of several popular models of tablets 2, e.g., by being selected to be slightly larger than the thickest tablet 2 for which the support cushion 10 is being designed. In an example, the gap space Gs space can be from about 0.37 inches (9.5 mm) to about 0.43 inches (11 mm), for example about 0.39 inches (about 10 mm).

The stop 42 can protrude upwardly from the upper surface 16 to a height Hs (FIG. 7) that is sufficiently high so that the stop 42 has sufficient structural strength to support the tablet 2, or to prevent or reduce the likelihood of the edge 6 of the tablet sliding over the stop 42, or both. In an example, the Hs of the stop 42 can be from about ⅛ inch (3 mm) to about ¾ inches (19 mm), such as about ⅜ inches (9.5 mm).

Other dimensions of the stop 42, such as a longitudinal (e.g., front to back) width Ws (FIG. 5) and a lateral (e.g., side to side) length Ls (FIGS. 3 and 5) along the upper surface 16 of the base member 12, can be configured so that the stop 42 has sufficient structural strength, integrity, and rigidity to sufficiently support the tablet 2. The dimensions of the stop 42 can also be selected so as to minimize interference with typical control motions or gestures by a user during operation of the tablet 2, e.g., by way of the stop 42 being in a location where a user would be expected to rest his or her hand during operation of the tablet 2. In an example, the stop 42 has a longitudinal width Ws of from about ⅛ inch (3 mm) to about ¾ inches (19 mm), such as about ⅜ inches (9.5 mm). In an example, the protrusion has a lateral length Ls that is from about 25% to 100% of the lateral (side to side) width of the base member 12, such as about 50% of the lateral width of the base member 12. If the length Ls is less than the total width of the base member 12, then the stop 42 can be laterally centered on the base member 12.

The stop 42 can have a profile, e.g., a cross sectional shape, that is comfortable for a user, should the user choose to rest his or her hand or hands on the stop 42, and that is visually appealing. In an example, the stop 42 has a generally rounded profile (best seen in FIGS. 7 and 16), which can include a planar or substantially planar support face 44 that is configured to face generally toward the back member 14 in order to engage the edge 6 of the tablet 2. The stop 42, or at least the support face 44 can be configured to be resilient to provide sufficient support for the tablet 2. In an example, at least a portion of the stop 42 is made from a polymer, such as polyester. For example, a core or center of the stop 42 can be made from a ridged and braided polyester fiber cord which is wrapped in the same fabric material that covers the base member 12.

In an example, the stop 42 is compressible or deflectable so that the weight of the laptop 4 can be sufficient to compress of deflect the stop 42 when the support cushion 10 is supporting the laptop 4. A compressible or deflectable stop 42 can be moved out of the way so that the keyboard of the laptop 4 is not uncomfortably angled for the user.

In some examples, a protrusion, such as the stop 42, may not be necessary if the coefficient of friction between the material of the tablet 2 and the material on the upper surface 16 of the base member or between the material of the tablet 2 and the material on a support surface 46 of the device support member 18, or both, is expected to be sufficiently high to maintain the upright position of the tablet 2 relatively to the base member 12 my preventing the tablet 2 from sliding down the device positioning member 2.

The support cushion 10 can include a securing structure configured to secure the support cushion 10 in one or both of the first configuration (e.g., the tablet mode) or the second configuration (e.g., the laptop mode). The securing structure can be configured to secure the back member 14 relative to the base member 12 when the back member 14 is in one or both of the tablet mode or the laptop mode. In the example shown in the Figures, the securing structure comprises an elastic strap 48 that is secured to either the back member 14 or the base member 12 and that can be stretched and wrapped around the other of the back member 14 or the base member 12 to secure the members 12, 14 together.

Figure 1:
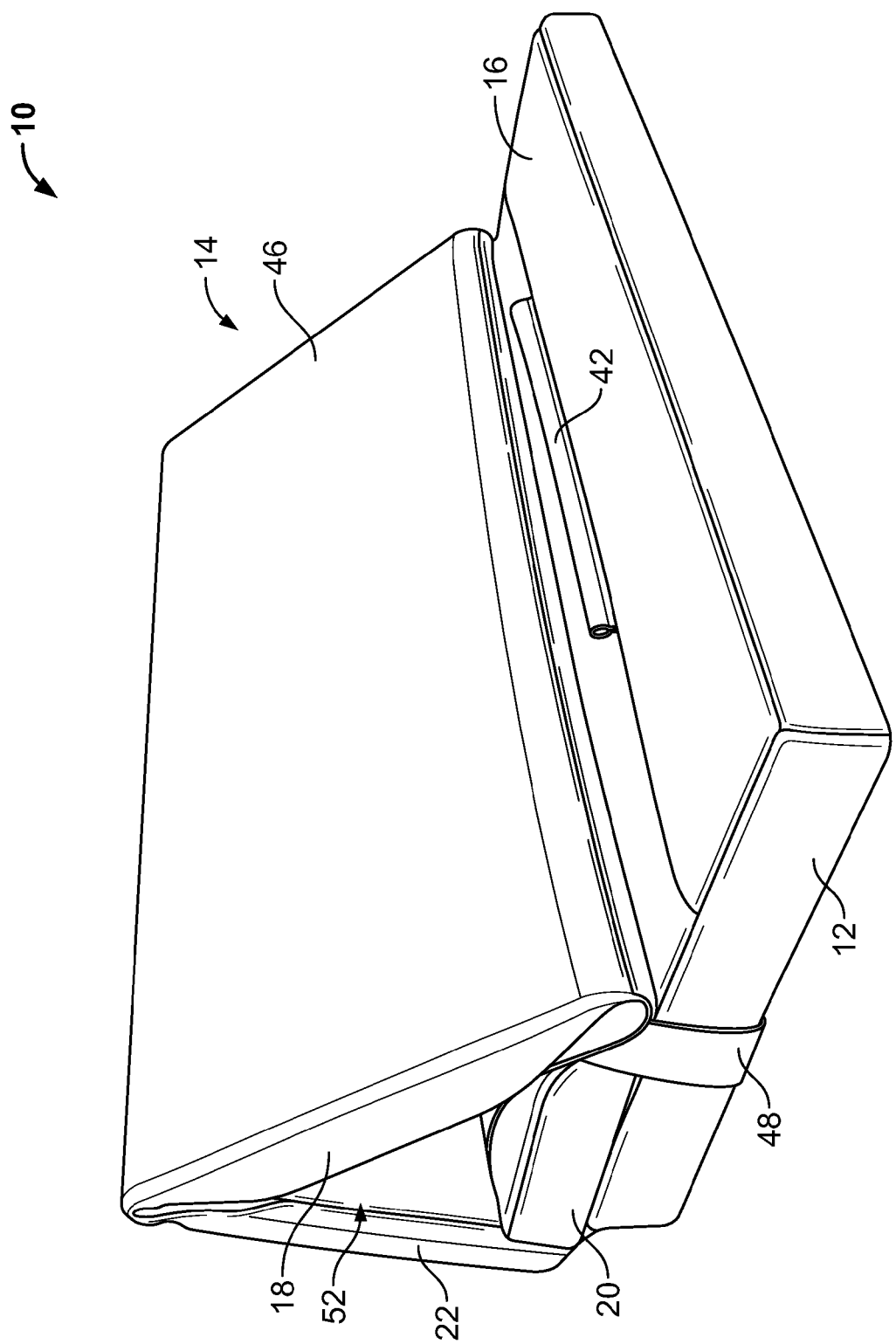
FIG. 1 is a front perspective view of an example support cushion in a first configuration for supporting a tablet device.
Figure 2:
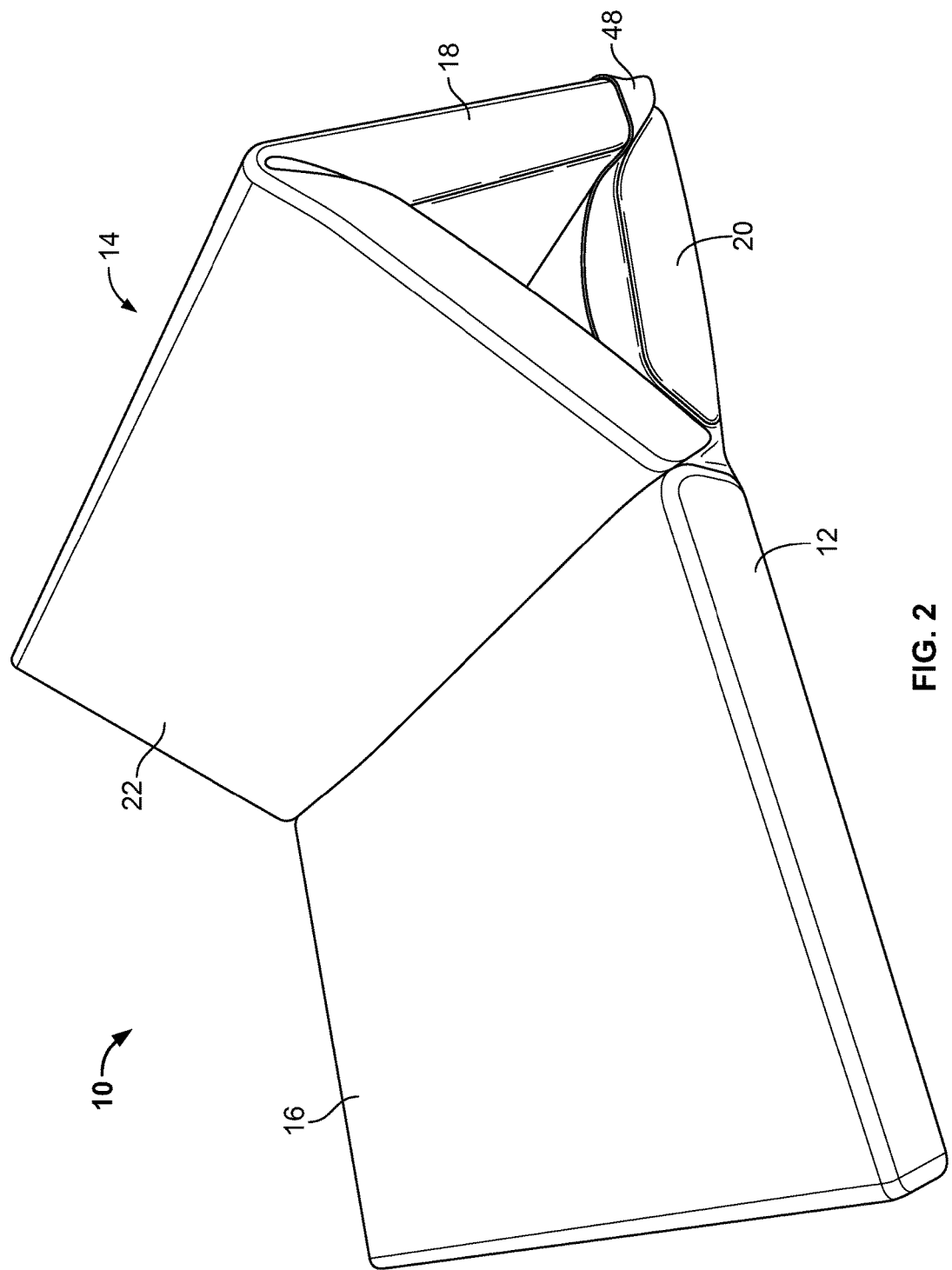
FIG. 2 is a front perspective view of the example support cushion in a second configuration for support a laptop computing device.
Figure 3:
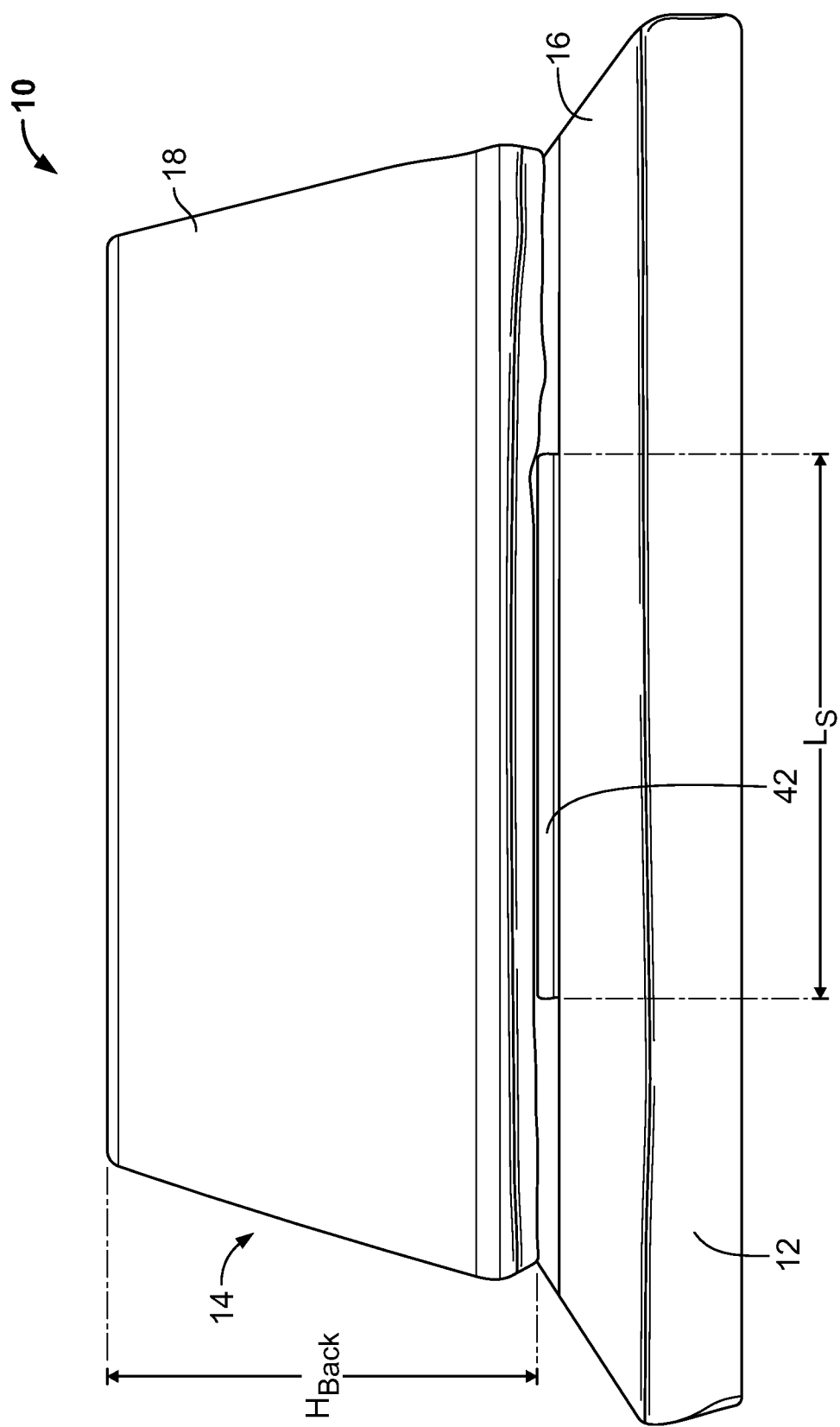
FIG. 3 is a front view of the example support cushion in the first configuration.
Figure 4:
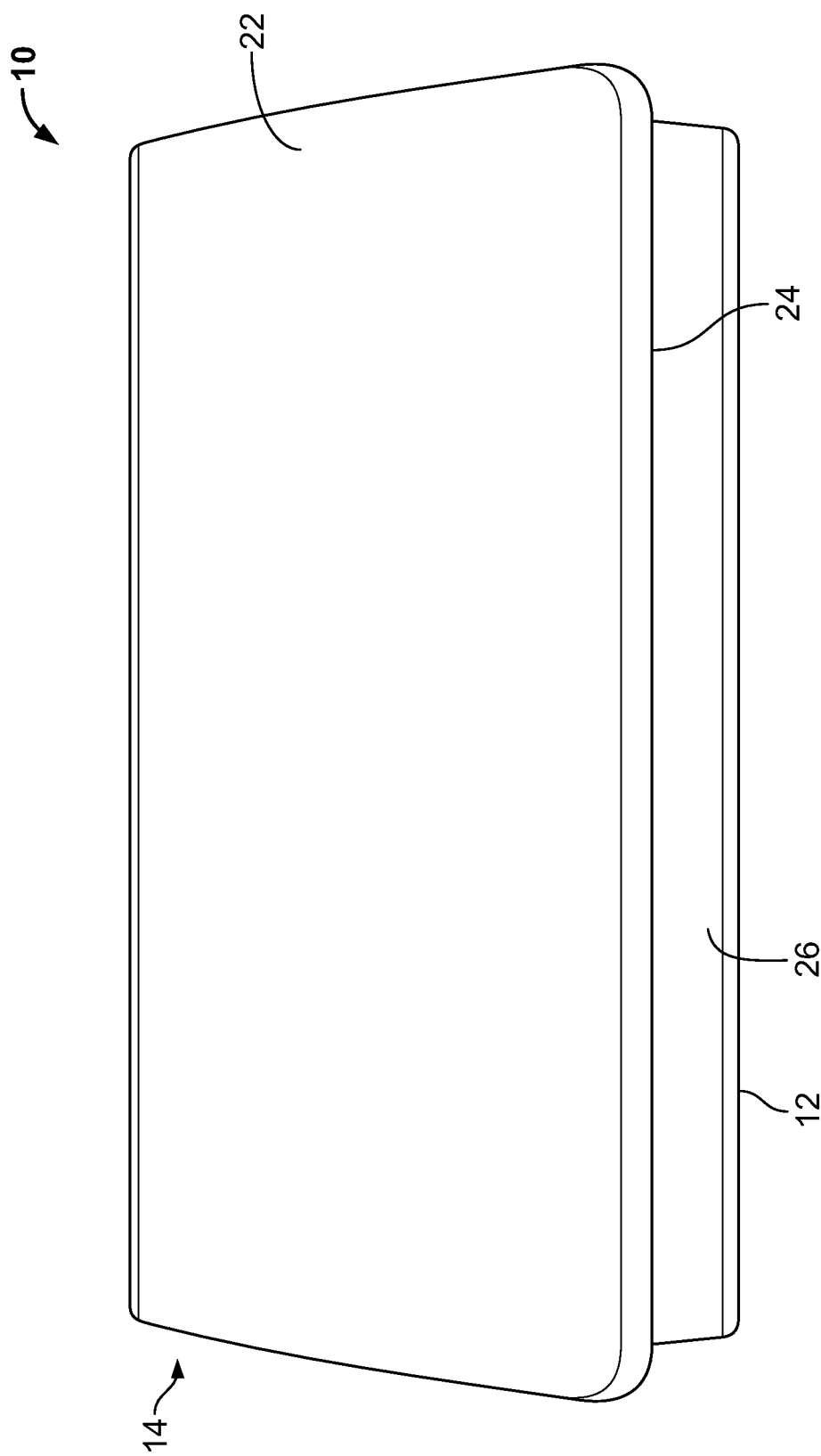
FIG. 4 is a rear view of the example support cushion in the first configuration.
Figure 5:
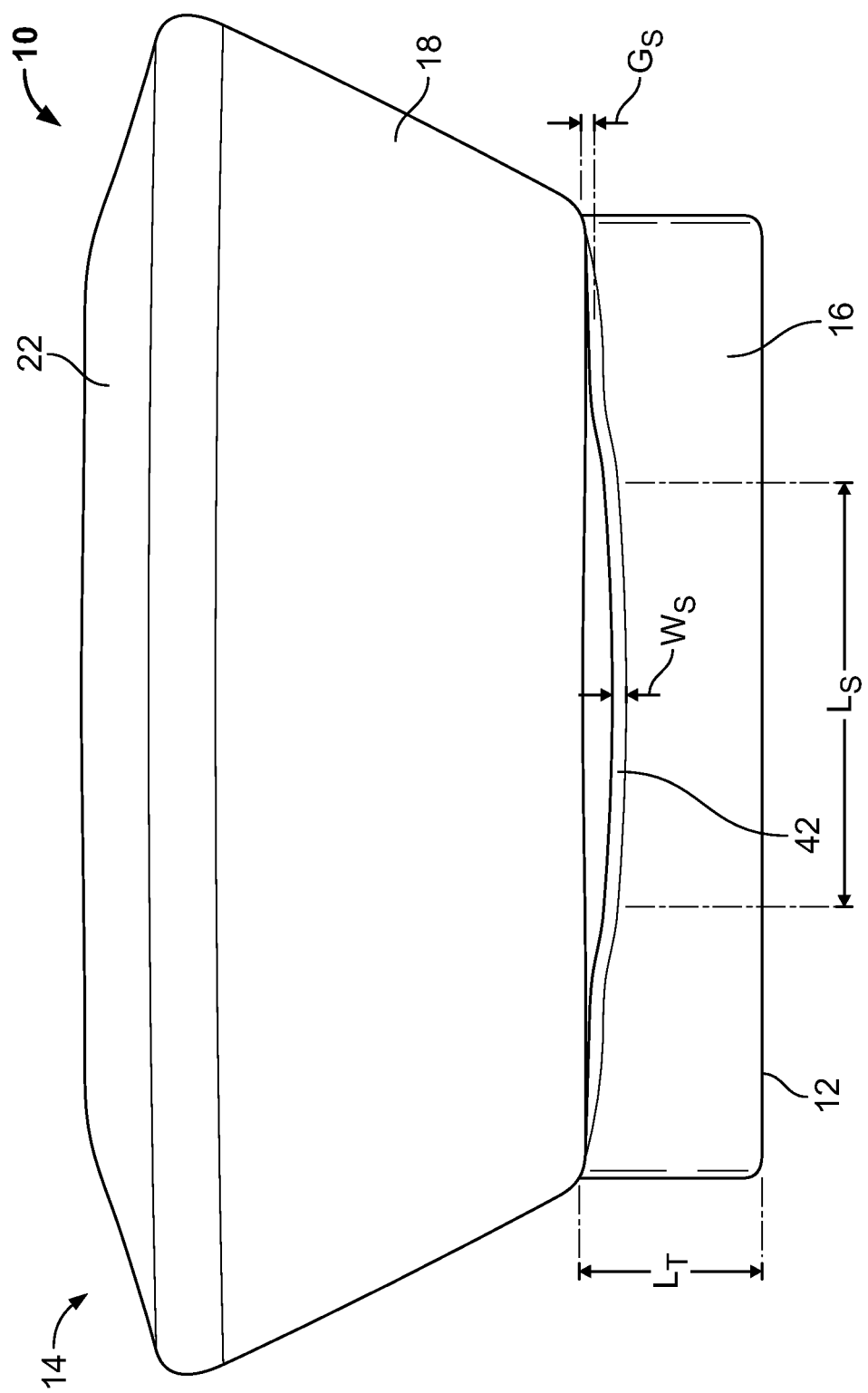
FIG. 5 is a top view of the example support cushion in the first configuration.
Figure 6:
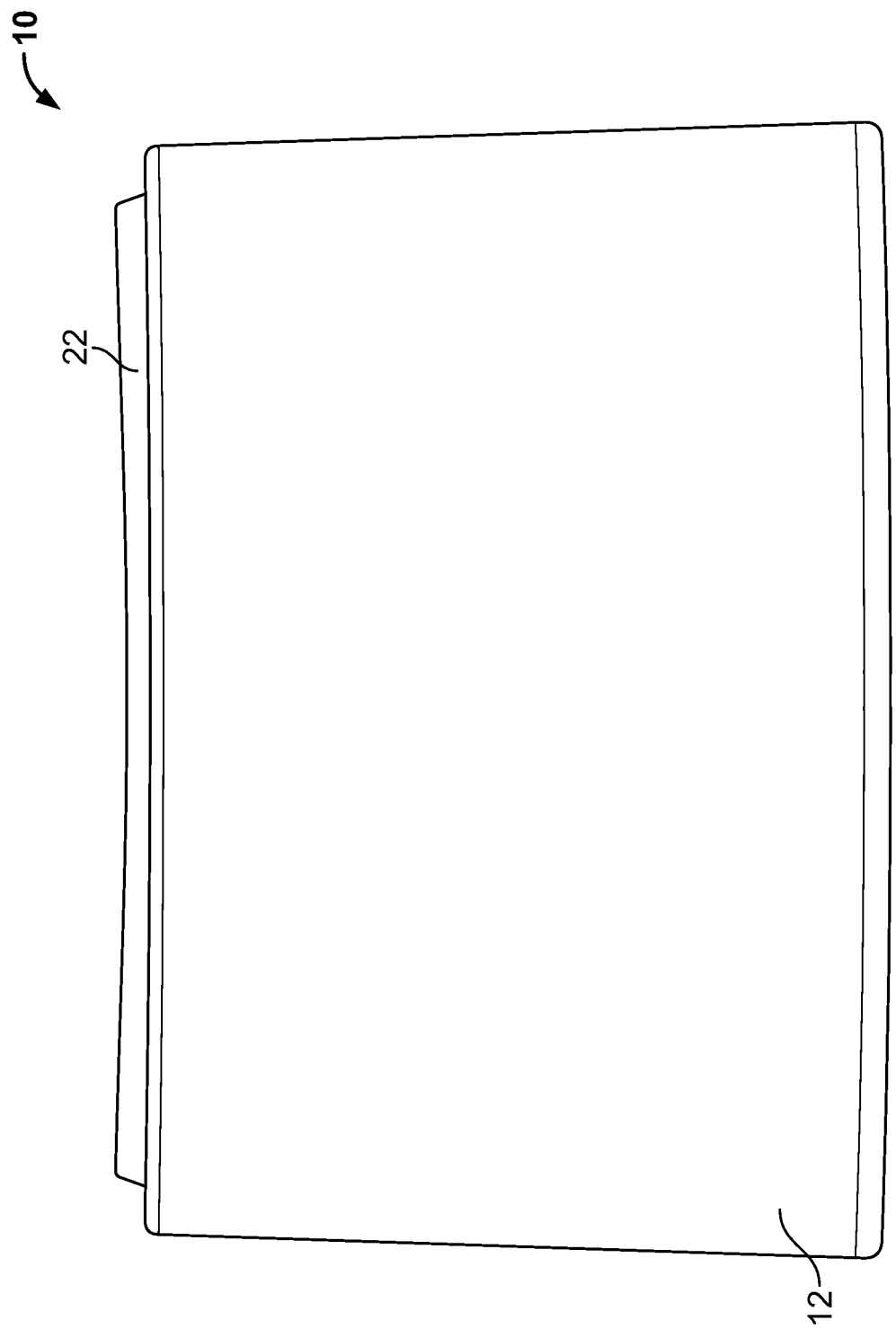
FIG. 6 is a bottom view of the example support cushion in the first configuration.
Figure 9:
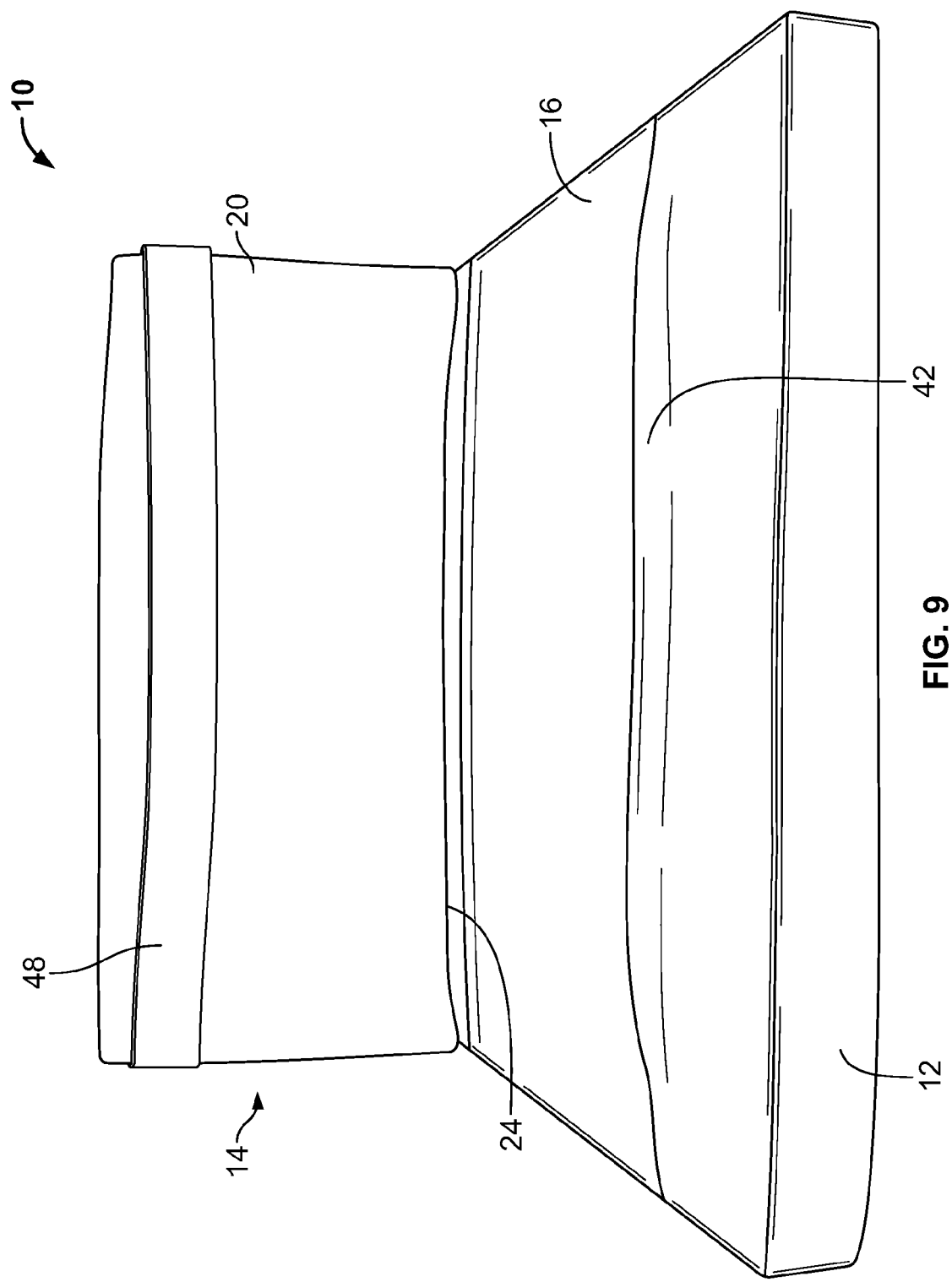
FIG. 9 is a front view of the example support cushion in the second configuration.
Figure 10:
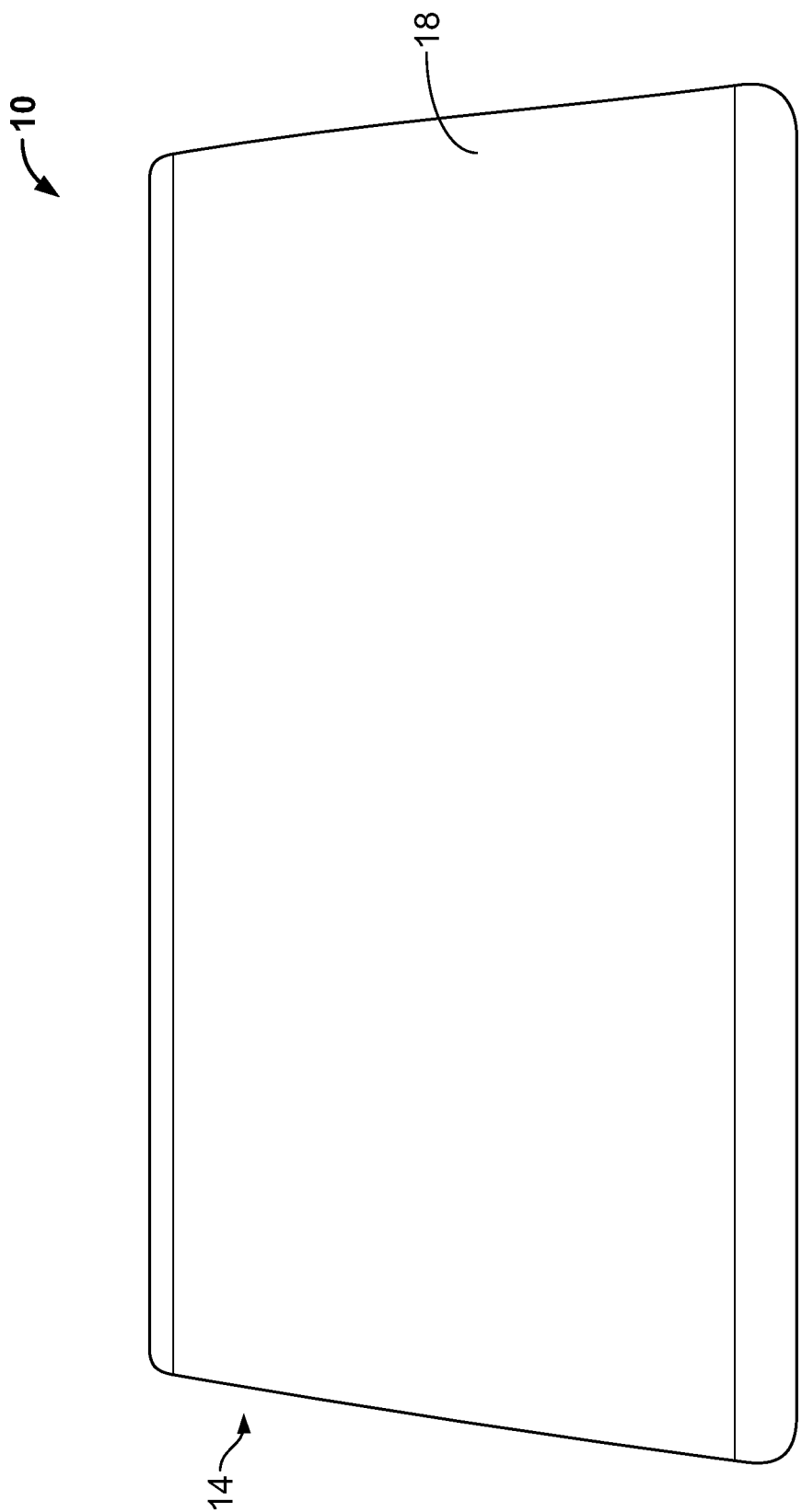
FIG. 10 is a rear view of the example support cushion in the second configuration.
Figure 11:
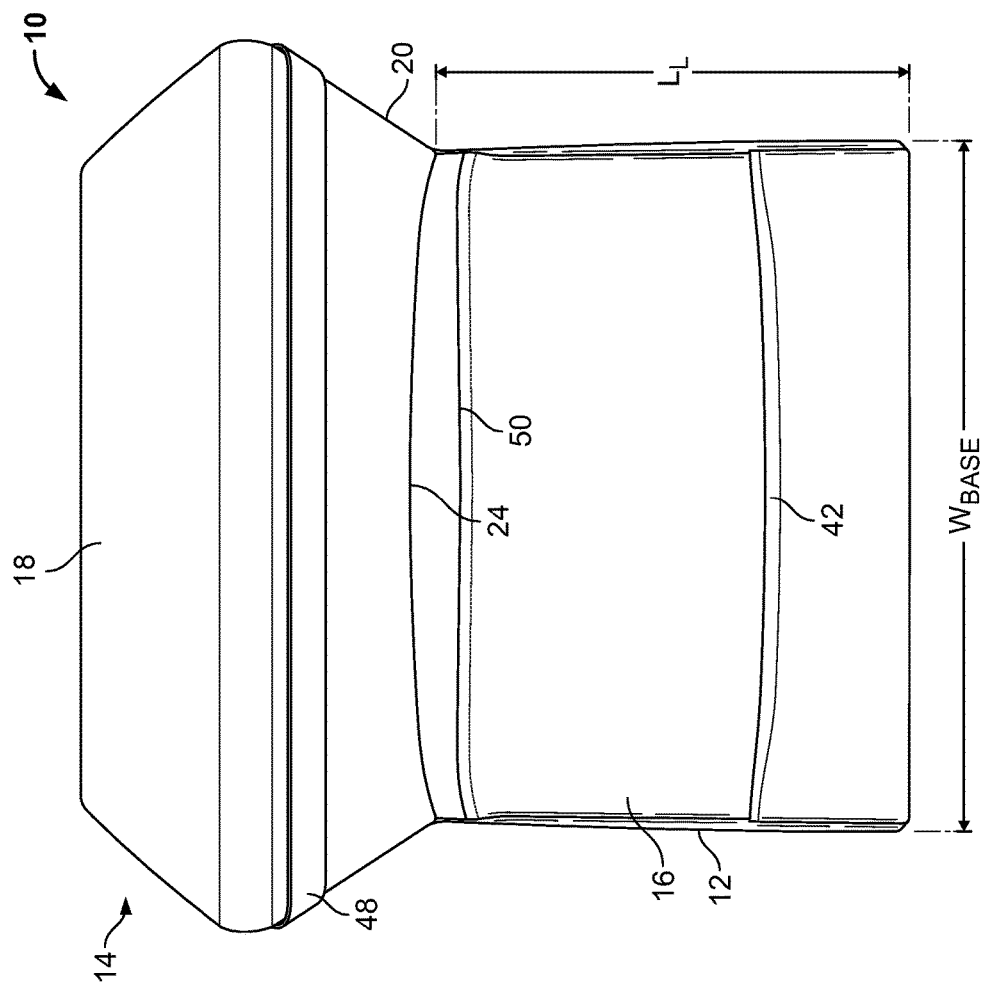
FIG. 11 is a top view of the example support cushion in the second configuration.
Figure 12:
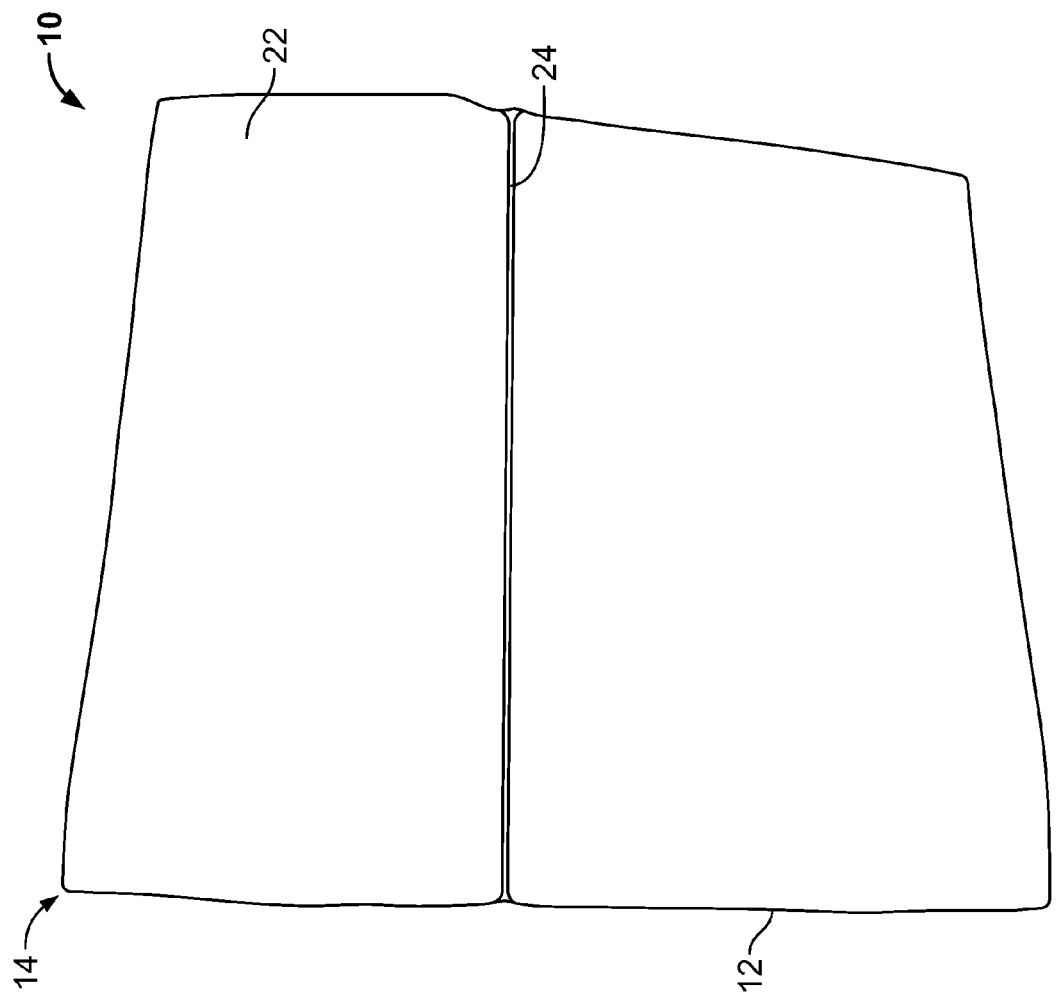
FIG. 12 is a bottom view of the example support cushion in the second configuration.
Figure 13:
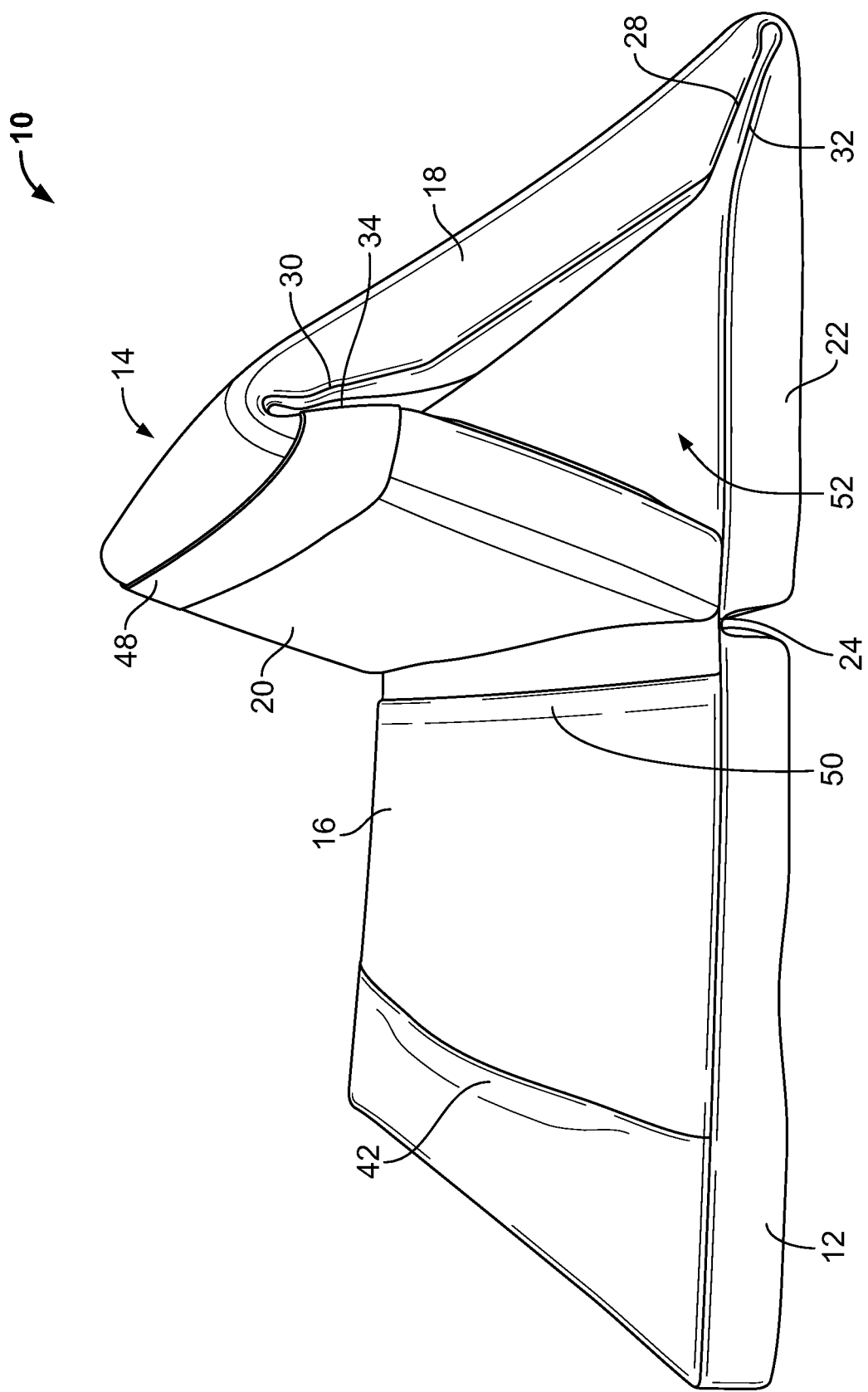
FIG. 13 is a side view from the first side of the example support cushion in the second configuration.

As shown, for example in FIGS. 2, 9, and 13, the strap 48 can be coupled to the back member 14, such as by being stitched or otherwise secured to the back surface 36 of the device support member 18, and can be configured so that the strap 48 can be wrapped around the base member 12 to secure the back member 14 and the base member 12 together when the support cushion 10 is in the tablet mode (for example as shown in FIGS. 1 and 7).

The strap 48 can be made from an elastic material, such as an elastic fabric, with an elastic modulus that is sufficiently high so that when the strap 48 is wrapped around the base member 12, for example, then the back member 14 and the base member 12 are sufficiently secured together, e.g., so that the back member 14 and the base member 12 do not move relative to each other during normal use of the support cushion 10. However, the elastic modulus of the strap 48 should not be so high that it is difficult for a user to pull the strap 48 over the base member 12 or to remove the strap 28 from the base member 12 to move the back member 14 from the tablet mode to the laptop mode, and vice versa.

As noted above, the back member 14 can be moved relative to the base member, for example by the pivoting connection of the joint 24, so that the back member 14 can be moved, relative to the base member 12, from the tablet mode to the laptop mode. As best seen in FIGS. 1 and 7, when in the tablet mode, the support cushion 10 can be in a more compact configuration with the back member 14 covering a portion of the upper surface 16 of the base member 12. When in the tablet mode, the back member 14 can leave only a small portion of the upper surface 16 exposed, e.g., just enough of the upper surface 16 to provide sufficient space to support a bottom edge 6 of the tablet 2 (see FIGS. 14-16). After being moved to the laptop mode, e.g., by pivoting the back member 14 relative to the base member 12, a larger surface area of the upper surface 16 can be exposed compared to when in the tablet mode.

In an example, the back member 14 can be moved completely off the base member 12 so that the entire upper surface 16 is exposed and is available to support a bottom side 8 of a laptop 4. Thus, when in tablet mode, the back member 14 covers a portion of the base member 12 so that the support cushion 10 has a smaller overall footprint in the tablet mode then when in the laptop mode (see, e.g., the difference in the exposed length of the upper surface 16 in the tablet mode $L_T$ (FIG. 5) compared to the exposed length of the upper surface 16 in the laptop mode $L_L$ (FIG. 11)).

The larger exposed surface area of the upper surface 16 when in the laptop mode can be configured to be large enough to provide support to a portion of a bottom side 8 of a laptop 4 that is sufficiently large to support the laptop 4 and space it from the user. For example, the exposed upper surface 16 when the support cushion 10 is in the laptop mode can keep the laptop 4 spaced from a user's lap during use while the user is sitting, for example on a chair or couch, or while the user is in a semi-supine position, e.g., while sitting up on a bed.

The base member 12 and the members that make up the back member 14, e.g., the device support member 18 and the structural members 18, 20, can comprise a resilient cushioning material, such as a resilient foam, a resilient spacer material, or other cushioning material. In an example, the material of at least a portion of the base member 12, at least a portion of the device support member 18, and at least a portion of the support members 18, 20 has a indentation force deflection at 25% deflection of at least about 50 pounds-force, such as at least about 60 pounds-force, for example at least about 65 pounds-force, and a density of at least about 1 pound per cubic foot (lb/ft$^3$), such as at least about 1.25 lbs/ft$^3$, such as at least about 1.5 lbs/ft$^3$. An example of a material that can make up at least a portion of each member 12, 16, 18, 20, such as a core of each member 12, 16, 18, and 20, comprises a polyurethane having a thickness of about 1 inch (about 2.5 cm) sold by Future Foam, Inc., of Council Bluffs, Iowa, USA. The members 12, 16, 18, and 20 can be covered by a fabric casing, such as an upholstery fabric that is configured for at least one of durability, comfort, pleasing feel, and pleasing appearance.

In an example, the base member 12 can also comprise a material that can act, at least partially, as a heat barrier between the electronic device being supported by the support cushion 10 and the user. For example, if the support cushion 10 is being used to support a laptop 4 and the user places both the support cushion 10 and the laptop 4 on the user's lap, the base member 12 can act to block or reduce the transmission of heat from the laptop 4 to the user's legs.

The base member 12 and the back member 14 can be sized and configured to accommodate many popular sizes and configurations of electronic devices, such as tablets, e-readers, and laptop computers. For example, a typical size for a smaller-sized tablet device is a diagonal screen size of about 7-8 inches (about 17.8-20.3 cm), such as the Apple IPAD MINI (having a height of about 7.8 inches (about 20 cm), a width of about 5.3 inches (about 13.5 cm), and a thickness of about 0.28 inches (about 7.2 mm)) or the Samsung GALAXY TAB 7.0 (having a height of about 7.4 inches (about 18.8 cm), a width of about 4.4 inches (about 11 cm), and a thickness of about 0.39 inches (about 10 mm)). A typical size for a larger-sized tablet device is a diagonal screen size of about 10 inches (about 25.5 cm), such as the Apple IPAD (having a height of about 9.5 inches (about 24 cm), a width of about 7.3 inches (about 18.5 cm), and a thickness of about 0.37 inches (about 9.5 mm)) or the Samsung GALAXY TAB 10.1 (having a height of about 9.5 inches (about 24 cm), a width of about 6.9 inches (about 17.5 cm), and a thickness of about 0.31 inches (about 7.9 mm)). Typical sizes of laptop computers are a diagonal screen size of about 11 inches (about 28 cm), about 13 inches (about 33 cm), about 15 inches (about 38 cm), and about 17 inches (about 43 cm).

In an example, the dimensions of the various members 12, 18, 20, 22 of the support cushion 10 can be configured to accommodate some or all of the popular device sizes described above. In an example, the base member 12 can have a width $W_{Base}$ in the lateral direction (e.g., left to right in the top view of FIG. 11) of from about 10 inches (about 25.5 cm) to about 20 inches (about 50 cm), such as from about 11 inches (about 28 cm) to about 15.5 inches (about 39 cm), such as about 13 inches (about 33 cm). The base member 12 can also have a longitudinal length (e.g., top to bottom in the top view of FIG. 11, equal to the exposed length $L_L$ of the laptop mode) of from about 8 inches (about 20 cm) to about 15 inches (about 38 cm), for example from about 9 inches (about 23 cm) to about 13 inches (about 33 cm), such as about 10 inches (about 25.5 cm).

As shown in the Figures, the width of the device support member 18 and the structural members 20, 22 can be substantially the same as the width $W_{Base}$. The back member 14 can be configured to have a total height $H_{Back}$ that is from about 5 inches (about 12 cm) to about 10 inches (about 25.5 cm), such as about 6.5 inches (about 16.5 cm), which can result in a total height of the support cushion 10, when in the tablet mode, of from about 6 inches (about 15 cm) to about 12 inches (about 30.5 cm), such as about 7.5 inches (about 19 cm).

The support cushion 10 can also include one or more structures for storage. In an example, the support cushion 10 can include a device pocket 50 configured to hold an electronics device, and in particular an electronics device that the support cushion 10 is configured to support. In particular, the device pocket 50 can be configured to store a tablet 2, such as an Apple IPAD or a Samsung GALAXY TAB tablet. In an example, the pocket 50 can comprise a piece of fabric or other material that is laid over the top of a portion of the base member 12 and coupled to the base member 12, such as by adhering or stitching the piece of fabric or other material to the base member 12. The piece of fabric or other material and the top of the base member 12 can therefore form a chamber within the pocket 50 for storage of the electronic device, such as the tablet 2.

Figure 22:
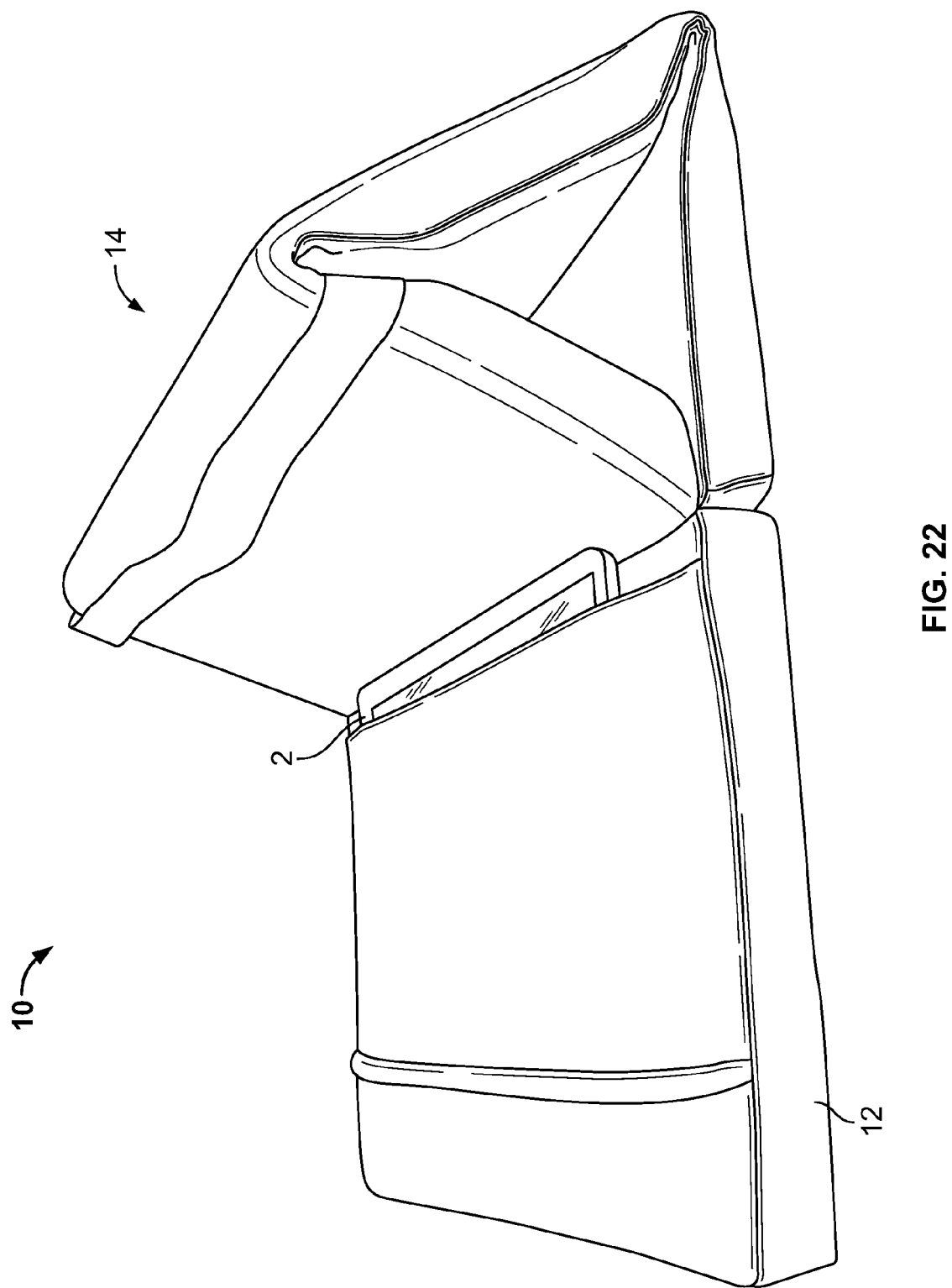
FIG. 22 is a side view of the example support cushion in the second configuration with a tablet device being stored in a device pocket in a base of the support cushion.
Figure 23:
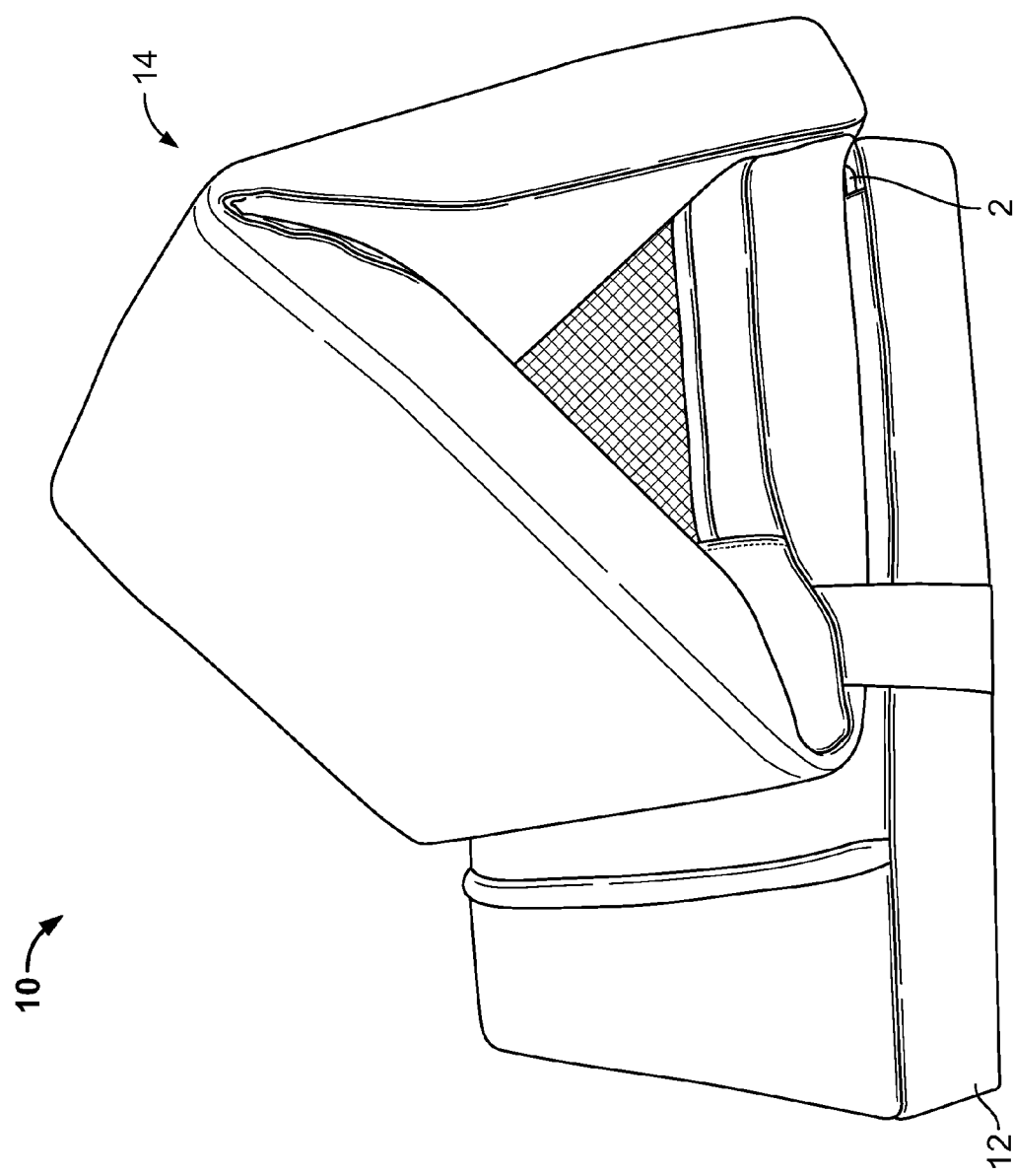
FIG. 23 is a side view of the example support cushion in the first configuration with the tablet device stored in the device pocket in the base.

As described above, the support cushion 10 is configured so that the back member 14 is pivotally coupled to the base member 12 so that the back member 14 covers a portion of the base member 12, including covering at least a portion of the pocket 50, when in the tablet mode. In such a configuration, the tablet 2 or other electronic device can be placed in the device pocket 50 when the support cushion 10 is in the laptop mode, as shown in FIG. 22. The back member 14 can then be pivoted about the pivot joint 24 into the tablet mode so that the back member 14 can cover and, to a certain extent, protect at least a portion of the tablet 2, as shown in FIG. 23. In this way, the support cushion 10 can act as a carrying or protecting case for the table 2 when the tablet 2 is stored in the device pocket 50. The support cushion 10 can provide more protection to the tablet 2 than a typical, day to day table case because the support cushion 10 has a larger amount of padding compared to typical carrying cases. For example, storing the tablet 2 in the support cushion 10 when in the tablet mode, as in FIG. 23, can provide protection when packing the tablet 2 in luggage, where more padding than is provided with typical carrying cases or screen protectors may be desired.

In an example, the support cushion 10 can continue to support a table 2, a laptop 4, or another electronic device, even if another tablet 2 is stored within the pocket 50. For example, a user could place a first tablet 2 in the pocket 50 (as shown in FIG. 22), and rather than pivoting the back member 14 to cover the pocket 50 and the first tablet 2, a laptop 4 can be placed on the top surface 16 of the base member 12. Alternatively, the back member 14 can be pivoted to cover the pocket 50 and the first table 2 in the pocket 50. Then, a second tablet device, which may be the same type of tablet as the first tablet 2 in the pocket 50 or a different tablet device, can be supported by the back member 14 and the base member 12, as described above. In other words, in an example, the storage of a tablet device 2 in the pocket 50 will not interfere with the normal use and operation of the support cushion 10.

The support cushion 10 can also include one or more other storage structures, for example for storing accessories associated with the electronic device being supported or to store other accessories or objects for the user. For example, a variety of accessories can be used with the tablet 2 and the laptop 4, including, but not limited to, at least one of: a power supply and a power cable; peripheral devices, such as a mouse or a keyboard; cables associated with the peripheral devices, e.g., to provide communication between the tablet 2 or the laptop 4 and the peripheral device; Bluetooth accessories, such as a Bluetooth headset, Bluetooth enable headphones, or another Bluetooth enabled accessory; and the like. A user may also wish to store other objects that are not necessarily associated with the tablet 2 or the laptop 4, such as a book, a television remote control, or some other object.

Figure 24:
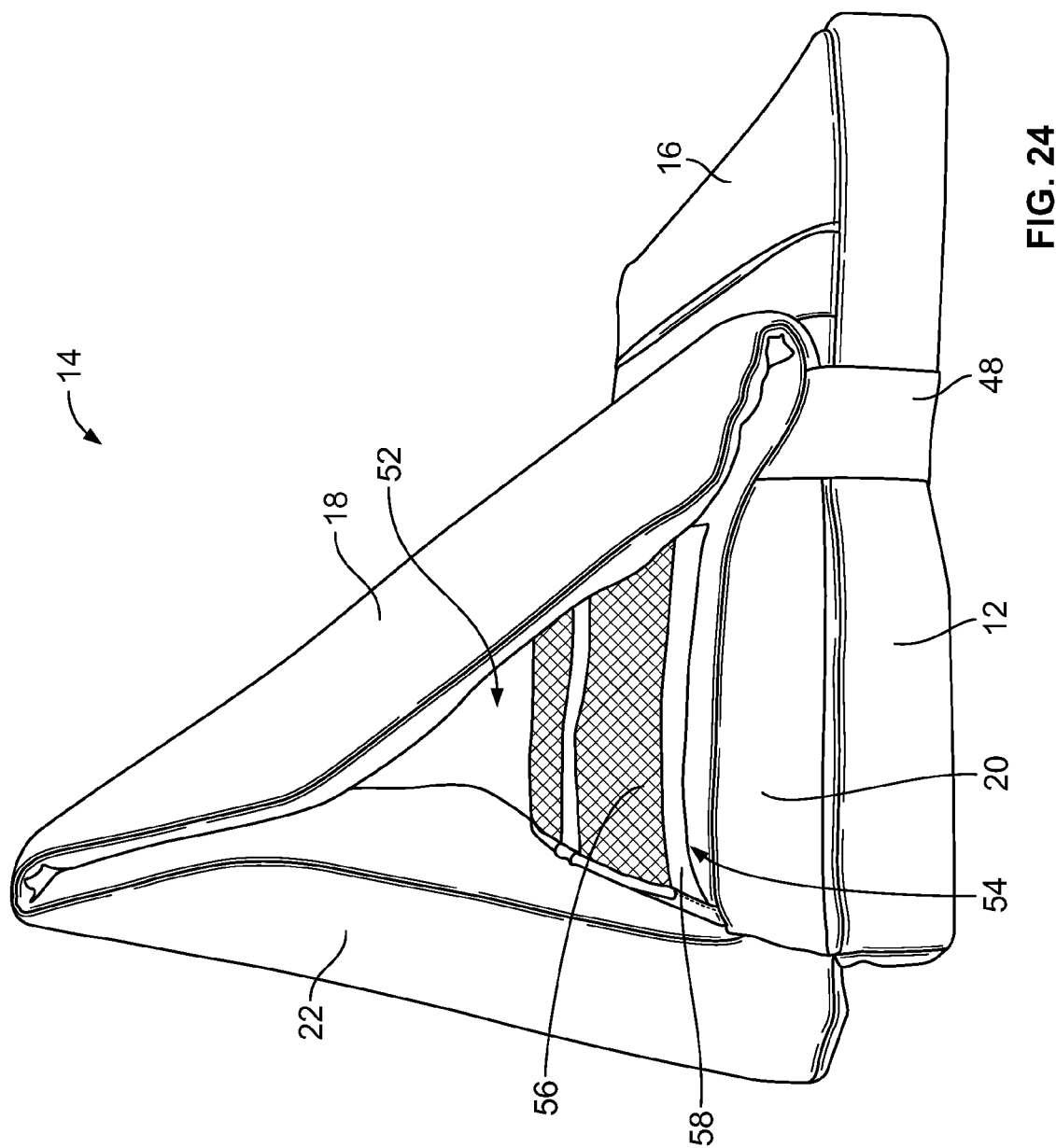
FIG. 24 is a side view of the example support cushion in the first configuration with a storage pocket in a storage compartment.

The support cushion 10 can include a hollow storage compartment 52 within the back member 14. As shown, for example in FIGS. 8, 13, 16, and 20, the hollow space in the triangular prism formed by the device support member 18, the first structural member 20, and the second structural member 22 can form the storage compartment 52. A user can place objects inside the storage compartment 52. In an example, one or more accessory pockets 54 can be included inside the storage compartment 52 (FIG. 24) so that a user can further secure accessories or other objects. In an example, the storage pockets 54 can be coupled to a member 18, 20, 22, such as by stitching or adhering, and can include a netting material 56 and one or more elastic strips 58. The netting material 56 can allow a user to at least partially see into the storage pocket 54 to see any items inside. The elastic material of the one or more elastic strips 58 can be biased toward a closed position, e.g., with the elastic material of the elastic strips 58 causing the elastic strips to be compressed against a surface of one of the members 18, 20, 22 (e.g., to the first structural member 20 in FIG. 24). When a user wishes to put an object in the storage pocket 54, he or she can lift up a portion of the elastic strip 58 to form an opening through which the object can be placed. The user can then release of the elastic strip 58, and the elastic nature of the elastic strip 58 will return it to the closed position, to near to the closed position, or the object will be clamped between the elastic strip 58 and the member 18, 20, 22, depending on the size of the object placed in the storage pocket 54. FIG. 25 shows an example support cushion 10 with an object, in this case a power supply and cord 60 for the tablet 2

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A support cushion comprising:
    a first member comprising a first support surface; and
    a second member comprising a second support surface;
    a third member comprising a third support surface;
    a fourth member;
    wherein the second, third, and fourth member are connected to form a triangular prism structure that is hingedly coupled to the first member so as to pivot between first and second configurations in which the triangular prism structure has a triangular prism shape in the first configuration and substantially retains the triangular prism shape in the second configuration;

wherein the second, third, and fourth members have respective second, third, and fourth back surfaces that define a substantially hollow area with the second back surface angled with respect to the third and fourth back surface, the third back surface angled with respect to the second and fourth back surface, and the fourth back surface angled with respect to the second and third back surfaces; and wherein the first support surface of the first member and the second support surface of the second member are configured to cooperatively support a first electronic device when the second member and the third member are in the first configuration, and the first support surface of the first member and the third support surface of the third member are configured to support a second electronic device when the second member and the third member are in the second configuration.

2. The support cushion of claim 1, wherein the second member is configured so that the second support surface is at an angle from 120° to 130° relative to the first support surface when the second member is in the first configuration.

3. The support cushion of claim 1, further comprising a stop projecting from the first support surface of the first member, wherein the stop is configured to support an edge of the first electronic device when the second member is adjacent the first member in the first configuration.

4. The support cushion of claim 3, wherein the stop extends from the first support surface by between about ⅛ inch and about ¾ inch and wherein the stop is resiliently compressible.

5. The support cushion of claim 1, further comprising an elastic strap having first and second strap ends attached to edges of the third member and configured to secure the second member and the third member to the first member by wrapping around the first member when the second member is in the first configuration.

6. The support cushion of claim 1, further comprising a pocket in the first member, wherein the pocket is positioned on the first support surface of the first member and the pocket sized to store a tablet computing device such that an opening of the pocket is exposed in the second configuration and concealed in the first configuration.

7. The support cushion of claim 1, wherein the third member and the fourth member are both hingedly connected to the first member at a common joint such that the first support surface is positioned against the third surface and the second member is angled with respect to the first support surface when the second and third members are folded to the first configuration, and the third member is spaced from and angled with respect to the first member when the second and third members are pivoted to the second configuration.

8. The support cushion of claim 1, wherein the first electronic device comprises a tablet computing device or an electronic reader.

9. The support cushion of claim 1, wherein the second electronic device comprises a laptop computer.

10. The support cushion of claim 1, wherein the first member comprising a resilient foam, wherein the resilient foam comprises a polyurethane having a thickness of about 1 inch that is configured to provide a heat shield between at least one of the first electronic device and the second electronic device and a user.

11. The support cushion of claim 1, wherein the third surface of the third member is configured to support a display of a laptop computer when the second and third members are in the second configuration.

12. The support cushion of claim 1, further comprising a fabric material covering at least the first member and a stop defining a ridge extending laterally along the first support surface of the first member at a location suitable for inhibiting the edge of the tablet computing device or electronic reader from sliding along the first support surface, wherein the stop comprises a cord wrapped in the fabric material that covers at least the first member.

13. The support cushion of claim 12, wherein the stop is spaced from an edge of the second member by a gap between about 0.37 inches and about 0.43 inches when the second and third members are folded to the first configuration.

14. The support cushion of claim 1, wherein the first support surface defines a larger exposed surface area when in the second configuration and defines a smaller exposed surface area when in the first configuration.

15. The support cushion of claim 1, wherein the second member is connected to the third and fourth members at ends of the third and fourth members, the third member is connected to the second and fourth members at ends of the second and fourth members, and the fourth member is connected to the second and third members at ends of the second and third members in both the first and second configurations.

16. The support cushion of claim 1, and further comprising a fabric casing covering each of the first, second, third, and fourth members and that forms fabric joints between the first and fourth member, between the second and fourth member, and between the second and third member.

17. A support cushion comprising:

a base member;

a triangular prism having a second member, a third member, and a structural member that combine to form the triangular prism with a storage compartment that is defined by back surfaces of the second, third, and structure members extending longitudinally through the triangular prism, wherein the triangular prism is pivotably connected to the base member at a joint that connects to both an end of the third member and an end of the structural member so as to allow the triangular prism structure to pivot between first and second configurations; and wherein a base support surface of the base member and a second support surface of the second member are configured support a first electronic device resting on the base and second support surfaces when the triangular prism is in the first configuration with a third surface of the third member is in contact with the base surface of the base member, and wherein the base support surface of the base member and the third surface of the third member are configured to support a second electronic device when the triangular prism is in the second configuration with the third surface spaced from the base support surface.

18. The support cushion of claim 17, further comprising at least one storage pocket positioned within the storage compartment and having material separating an interior of the storage pocket from space in the storage compartment that is exterior of the storage pocket.

19. A support cushion comprising:

a base member comprising a first support surface; and a device support member coupled to the base member, the device support member comprising a second support surface;

wherein the device support member has a cross section with a substantially triangular-shaped outer perimeter and a substantially triangular shaped inner perimeter bounding a passage extending longitudinally through the device support member;

wherein the device support member is configured to move relative to the base member between a first configuration and a second configuration with the device support member retaining its same cross-section in both the first and second configurations;

wherein the first support surface of the base member and the second support surface of the device support member are configured to cooperatively support a tablet computing device or electronic reader resting on the base member and the device support member with the base member supporting an edge of the tablet computing device or electronic reader when the device support member is in the first configuration, wherein the base member includes a stop positioned on the first support surface of the base member at a location suitable for inhibiting the edge of the tablet computing device or electronic reader from sliding along the first support surface, and wherein the first support surface of the base member is configured to support a bottom of a laptop computer when the device support member is in the second configuration.

20. The support cushion of claim 19, and further comprising:

a netting material attached to an inner surface of the device support to define a storage compartment between the netting material and the inner surface, and a device pocket positioned on the first support surface of the base member, wherein an opening to the storage compartment is accessible in the first and second configuration and an opening to the device pocket is substantially concealed by the device support member in the first configuration.

* * * * *

UNITED STATES PATENT AND TRADEMARK OFFICE
CERTIFICATE OF CORRECTION

PATENT NO. : 9,578,941 B2
APPLICATION NO. : 14/518945
DATED : February 28, 2017
INVENTOR(S) : Lori MacLachlan, Rebecca Karnes-Toth and Joseph E. Blazar Page 1 of 1

It is certified that error appears in the above-identified patent and that said Letters Patent is hereby corrected as shown below:

In the Claims

Column 12; Line 52: In Claim 17, after "configured" insert -- to --.

Column 13; Line 8: In Claim 19, delete "triangular shaped" and insert -- triangular-shaped --, therefor.

Signed and Sealed this
Second Day of May, 2017

Michelle K. Lee
*Director of the United States Patent and Trademark Office*